United States Patent
Kapellen

(10) Patent No.: US 12,486,354 B2
(45) Date of Patent: Dec. 2, 2025

(54) PROCESSES FOR FORMING BISPHENOLS, EPOXY RESIN COMPOSITIONS

(71) Applicant: Westlake Epoxy Inc., Houston, TX (US)

(72) Inventor: Mark Kapellen, Barendrecht (NL)

(73) Assignee: WESTLAKE EPOXY INC., Houston, TX (US)

( * ) Notice: Subject to any disclaimer, the term of this patent is extended or adjusted under 35 U.S.C. 154(b) by 390 days.

(21) Appl. No.: 18/115,625

(22) Filed: Feb. 28, 2023

(65) Prior Publication Data

US 2024/0294701 A1  Sep. 5, 2024

(51) Int. Cl.

| | | |
|---|---|---|
| C08G 59/24 | (2006.01) |
| C07C 37/20 | (2006.01) |
| C07C 37/74 | (2006.01) |
| C07D 301/28 | (2006.01) |
| C07D 303/30 | (2006.01) |
| C08G 59/02 | (2006.01) |
| C08G 59/08 | (2006.01) |
| C08G 59/68 | (2006.01) |

(52) U.S. Cl.
CPC ......... *C08G 59/245* (2013.01); *C08G 59/022* (2013.01); *C08G 59/08* (2013.01); *C08G 59/68* (2013.01)

(58) Field of Classification Search
None
See application file for complete search history.

(56) References Cited

U.S. PATENT DOCUMENTS

| | | |
|---|---|---|
| 5,648,561 A | 7/1997 | Tan et al. |
| 7,049,388 B2 | 5/2006 | Boriack et al. |
| 10,316,211 B2 | 6/2019 | Niederst et al. |
| (Continued) | | |

FOREIGN PATENT DOCUMENTS

| | | |
|---|---|---|
| EP | 0799264 A1 | 10/1997 |
| EP | 3371241 B1 | 1/2021 |
| (Continued) | | |

OTHER PUBLICATIONS

International Search Report and Written Opinion dated May 29, 2024 for Application No. PCT/US24/15900.

(Continued)

*Primary Examiner* — Ha S Nguyen
(74) *Attorney, Agent, or Firm* — Patterson + Sheridan, LLP

(57) ABSTRACT

Embodiments of the present disclosure generally relate to processes for forming bisphenols and epoxy resin compositions. In an embodiment, a process for making an epoxy resin composition is provided. The process includes reacting a mixture comprising a catalyst, a monophenol, and an aldehyde or ketone, the mixture comprising a stoichiometric excess of the aldehyde or ketone to the monophenol, and forming a reaction product with the reaction mixture, the reaction product comprising a bisphenol. The process further includes removing water and unreacted aldehyde or ketone from the reaction product, and converting the reaction product comprising the bisphenol to an epoxy resin composition, wherein, after reacting the mixture and before converting the reaction product, the process is free of washing, drying, solid-liquid separation, or combinations thereof.

13 Claims, 5 Drawing Sheets

(56) References Cited

U.S. PATENT DOCUMENTS

| | | |
|---|---|---|
| 2004/0116751 A1 | 6/2004 | Carvill et al. |
| 2017/0174598 A1 | 6/2017 | Manchekar et al. |
| 2020/0047170 A1 | 2/2020 | Papile |
| 2021/0403633 A1 | 12/2021 | Evans et al. |

FOREIGN PATENT DOCUMENTS

| | | | |
|---|---|---|---|
| JP | 2000345008 A | * | 12/2000 |
| JP | 2002187862 A | | 7/2002 |
| JP | 2022151938 A | * | 10/2022 |
| KR | 20210083691 A | | 7/2021 |
| WO | 2000035847 A1 | | 6/2000 |
| WO | 2004013075 A1 | | 2/2004 |

OTHER PUBLICATIONS

Taiwan Office Action dated Aug. 27, 2025 for Application No. 113106995.

* cited by examiner

PROCESSES FOR FORMING BISPHENOLS, EPOXY RESIN COMPOSITIONS

FIELD

Embodiments of the present disclosure generally relate to processes for forming bisphenols and epoxy resin compositions.

BACKGROUND

Bisphenols, such as tetramethyl bisphenol F (TMBPF), are utilized as a raw material component of various polymers such as epoxy resins and polycarbonate resins. Typically, formation of TMBPF requires reaction in a liquid phase where 2,6-xylenol is condensed with formaldehyde. As the TMBPF forms, it crystallizes into a slurry in the liquid phase. Prior to its use in the production of resins, conventional technologies convert the TMBPF slurry to a pure and dry powder of TMBPF. In order to form the pure and dry powder of TMBPF, the slurry is subjected to various purification operations such as a solid-liquid separation and washings, with subsequent drying. As a consequence, manufacturing and operation costs for conventional TMBPF production are high. Beyond these costly operations, TMBPF is conventionally made using an excess of 2,6-xylenol. For the production of epoxy resins such as tetramethyl bisphenol F diglycidyl ether (TMBPF-DGE), the pure and dry powder of TMBPF is then fed to a reactor. Such feeding is time-intensive and challenging because powders can be difficult to handle. Overall, the production of TMBPF and other bisphenols and their subsequent utilization for the manufacture of epoxy resins is inefficient and costly.

Therefore, there is a need for new and improved processes for forming bisphenols such as TMBPF and epoxy resin compositions from such bisphenols.

SUMMARY

Embodiments of the present disclosure generally relate to processes for forming bisphenols, epoxy resin compositions, and TMBPF. Embodiments of the present disclosure enable reduced production costs of bisphenols (such as TMBPF) and epoxy resin compositions, and TMBPF relative to previous technologies. Further, embodiments described herein enable integration of bisphenol production with epoxy resin composition production, for example, the integration of TMBPF production with the subsequent glycidation of TMBPF to produce TMBPF-DGE.

In an embodiment, a process for making an epoxy resin composition is provided. The process includes reacting a mixture comprising a catalyst, a monophenol, and an aldehyde or ketone, the mixture comprising a stoichiometric excess of the aldehyde or ketone to the monophenol, and forming a reaction product with the reaction mixture, the reaction product comprising a bisphenol. The process further includes removing water and unreacted aldehyde or ketone from the reaction product, and converting the reaction product comprising the bisphenol to an epoxy resin composition, wherein, after reacting the mixture and before converting the reaction product, the process is free of washing, drying, solid-liquid separation, or combinations thereof.

In another embodiment, a process for forming a composition comprising a bisphenol is provided. The process includes introducing an aldehyde or ketone with a catalyst, a solvent, and monophenol to form a mixture, the mixture comprising a stoichiometric excess of the aldehyde or ketone to the monophenol. The process further includes reacting the mixture to form a composition comprising a bisphenol and one or more optional components, wherein about 90% or more of the monophenol is converted to the bisphenol and the one or more optional components.

In another embodiment, a process for converting a monophenol to a conversion product is provided. The process includes reacting a mixture comprising an aldehyde or ketone, a catalyst, a solvent, and a monophenol, to form a reaction product comprising a bisphenol, wherein the mixture comprises a stoichiometric excess of the aldehyde or ketone to the monophenol. The process further includes removing water and remaining aldehyde or ketone from the reaction product, the solvent having a boiling point of about 150° C. or more at 100 kPa (absolute). The process further includes converting the reaction product comprising the bisphenol to a conversion product, wherein, after reacting the mixture and before converting the reaction product, the process is free of washing, drying, solid-liquid separation, or combinations thereof.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

Figures included herein illustrate various embodiments of the disclosure. It is contemplated that elements and features of one embodiment may be beneficially incorporated in other embodiments without further recitation.

DETAILED DESCRIPTION

Embodiments of the present disclosure generally relate to processes for forming bisphenols and epoxy resin compositions. The inventor has discovered processes for forming bisphenols, such as TMBPF, that can be utilized for further processing into resins without complex separation and purification steps. Unlike conventional processes for forming bisphenols, the bisphenols described herein are in the form of a product mixture that can be utilized for subsequent processing without purification operations such as a solid-liquid separation, washings, and drying. Besides the bisphenol, the product mixture can contain by-products and solvent, and can be in the form of a slurry with the bisphenol partially or completely dissolved. As a consequence, manufacturing and operation costs are significantly less than conventional methods for forming bisphenols. Further, the use of a product mixture comprising the bisphenol in, for example, the form of a slurry, makes subsequent reactor loading of the bisphenol faster and safer.

In contrast to conventional technologies for forming bisphenols such as TMBPF, embodiments described herein can provide high conversion of the starting phenol, with little or no phenolic losses. Such high conversion of the starting phenol can be achieved, at least in part, by using an excess of formaldehyde. Use of excess formaldehyde contrasts conventional technologies utilizing excess of starting phenol. Further, excess formaldehyde utilized to form the bisphenols can be easily removed from the reaction product with the water that forms during bisphenol formation.

The use of headings is for purposes of convenience only and does not limit the scope of the present disclosure. Embodiments described herein can be combined with other embodiments.

Although embodiments of the present disclosure are described with respect to formaldehyde, it is contemplated that other aldehydes, as well as ketones, can be used, as further described below with respect to aldehydes and ketones of formula (III).

Integrated Process

Figure 1:
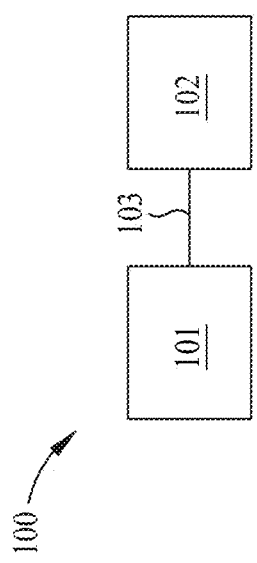
FIG. 1 is a flow diagram illustrating an integrated process for forming a composition according to at least one embodiment of the present disclosure.
Figure 2:
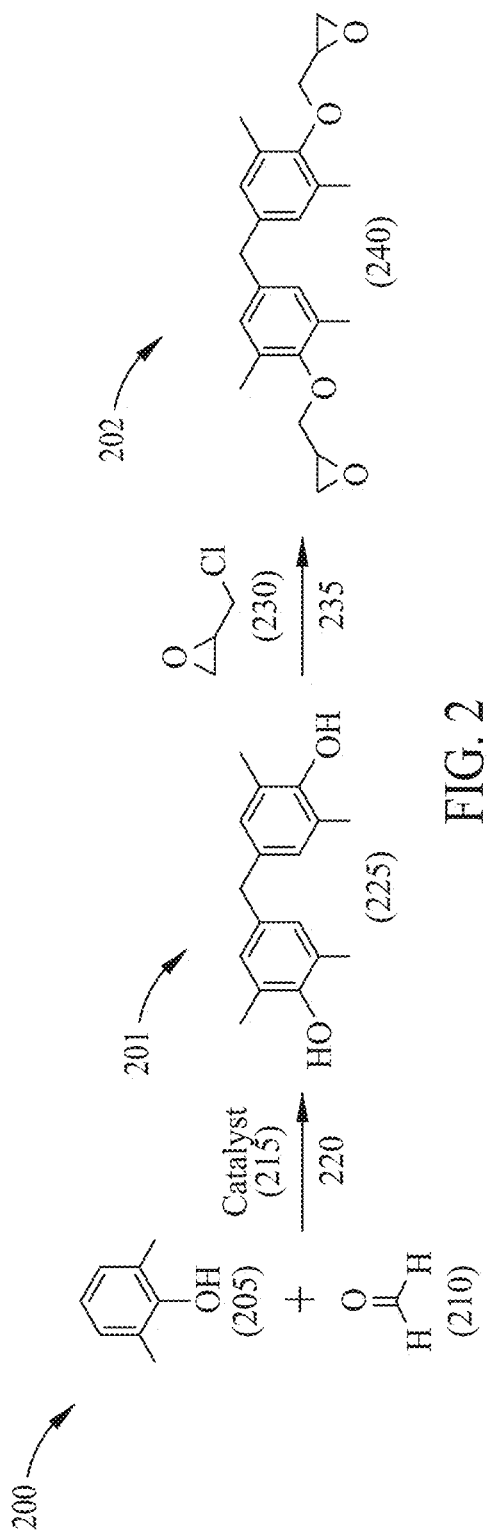
FIG. 2 shows a non-limiting reaction diagram for forming an example resin composition by using the integrated process of FIG. 1 according to at least one embodiment of the present disclosure.

FIG. 1 is a flow diagram illustrating an integrated process 100 for forming a composition according to at least one embodiment of the present disclosure. The composition formed by the integrated process 100 can include polymers such as resins, thermosets, thermoplastics, among other materials. In some examples, the composition formed by the integrated process 100 comprises, consists of, or consists essentially of a resin composition. The resin composition can be an epoxy resin composition or a polycarbonate resin composition, among other resin compositions. FIG. 2 shows a non-limiting reaction diagram 200 for formation of an example resin composition B that can be made using the integrated process 100 according to at least one embodiment of the present disclosure. In the example shown in FIG. 2, the resin composition B includes tetramethyl bisphenol F diglycidyl ether (TMBPF-DGE) 240. In FIG. 2, reference numeral 201 refers to a first composition, and reference numeral 202 refers to a second composition.

As used herein, a "composition" can include component(s) of the composition, reaction product(s) of two or more components of the composition, a remainder balance of remaining starting component(s), or combinations thereof. Compositions of the present disclosure can be prepared by any suitable mixing process.

Referring back to FIG. 1, the integrated process 100 can include formation of a first composition 201 comprising a bisphenol at operation 101. In this example, the bisphenol is tetramethyl bisphenol F 225 (TMBPF; CAS Number: 5384-21-4; also known as 4,4'-methylenebis(2,6-dimethylphenol)). Operation 101 can include reacting a mixture comprising a phenol (for example, 2,6-xylenol 205), formaldehyde 210, and a catalyst 215 under conversion conditions 220 to form the first composition 201 comprising TMBPF 225. The first composition 201 can be in the form of a reaction product or reaction mixture.

Figure 3A:
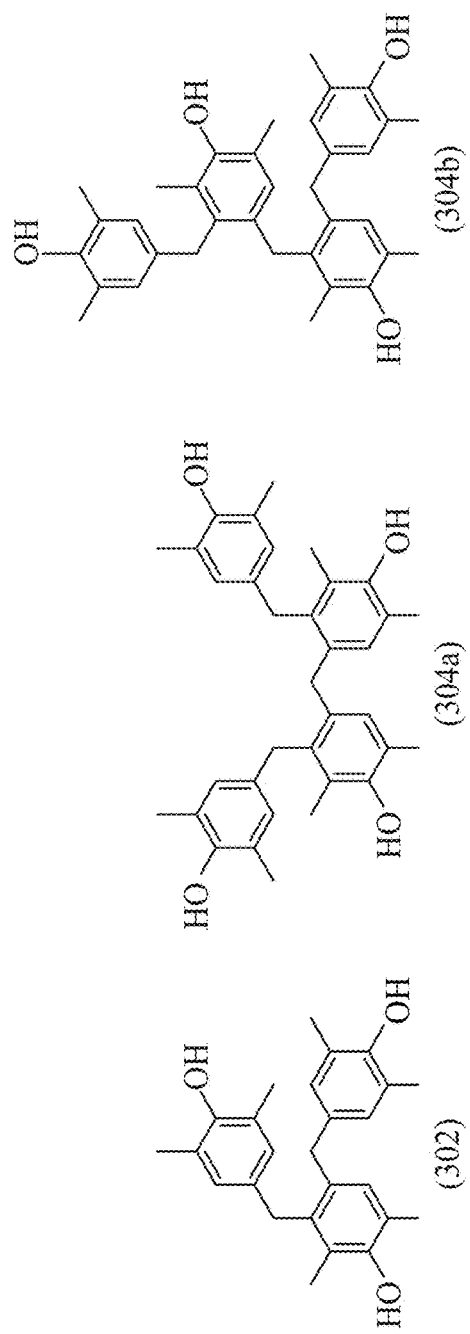
FIG. 3A shows examples of one or more additional components that can be formed during processes for forming tetramethyl bisphenol F (TMBPF) according to at least one embodiment of the present disclosure.

The first composition 201 can include one or more additional components besides the bisphenol. For example, the one or more additional components of first composition 201 can comprise, consist of, or consist essentially of a trimer, a tetramer, lights, heavies, and combinations thereof. When used for the first composition 201, the term "lights" includes components of the first composition 201 that have a boiling point lower than that of the bisphenol formed at operation 101. Examples of lights that can be part of the first composition 201 can include 2,6-xylenol, 2,4-xylenol, o-cresol, p-cresol, o-ethylphenol, formaldehyde, or combinations thereof. When used for the first composition 201, the term "heavies" includes components of the first composition 201 that have a boiling point higher than that of the bisphenol formed at operation 101. Heavies of the first composition 201 can include components having the higher boiling point that are not trimers and tetramers, such as higher oligomers. Examples of trimers and tetramers (the one or more additional components) that can be part of the first composition 201 can include hexamethyl trisphenol F 302 (an example trimer, also called a trisphenol) and octamethyl tetraphenol F 304a, 304b (example tetramers, also called tetrakisphenols) as shown in FIG. 3A. These trimers and tetramers can be formed during processes for forming TMBPF.

Unlike conventional technologies for forming TMBPF-DGE, the TMBPF formed during operation 101 can be directly used for the formation of TMBPF-DGE. That is, the integrated process 100 is free of separation, purification, and drying operations along path 103 between the production of TMBPF (in operation 101) and the production of TMBPF-DGE (in operation 102). This is a result of, for example, using excess formaldehyde for the reaction. Path 103 can represent, for example, feeding of a product mixture comprising TMBPF formed in operation 101 to a different reactor to undergo subsequent operations (for example, operation 102). Alternatively path 103 can represent that the subsequent process (for example, operation 102) is to be performed and that the subsequent process can be carried out in the same reactor as that reactor used for forming TMBPF, or carried out in situ, or carried out continuously.

Continuing with the non-limiting example shown in FIG. 2, the integrated process 100 can further include formation of a second composition 202 comprising a glycidated bisphenol from the first composition 201 (or reaction product) at operation 102. In this example, the glycidated bisphenol is TMBPF-DGE 240. Additionally, or alternatively, and in some embodiments, acrylation, acylation, alkylation, or any suitable reaction can be performed to form, for example, a polymerizable group chemically bonded to an oxygen atom of the bisphenol (and if present, an oxygen atom of one or more trimers, an oxygen atom of one or more tetramers, or combinations thereof) of first composition 201.

Operation 102 can include reacting a mixture comprising first composition 201 and a epihalohydrin (for example, epichlorohydrin 230) under conversion conditions 235 to form the second composition comprising TMBPF-DGE 240 (CAS Number: 113693-69-9). When the first composition 201 includes one or more additional components such as a trimer, a tetramer, lights, heavies, or combinations thereof, the second composition 202 can also include one or more additional components. The one or more additional components of second composition 202 can include a trimer, a tetramer, lights, heavies, or combinations thereof.

Figure 3B:
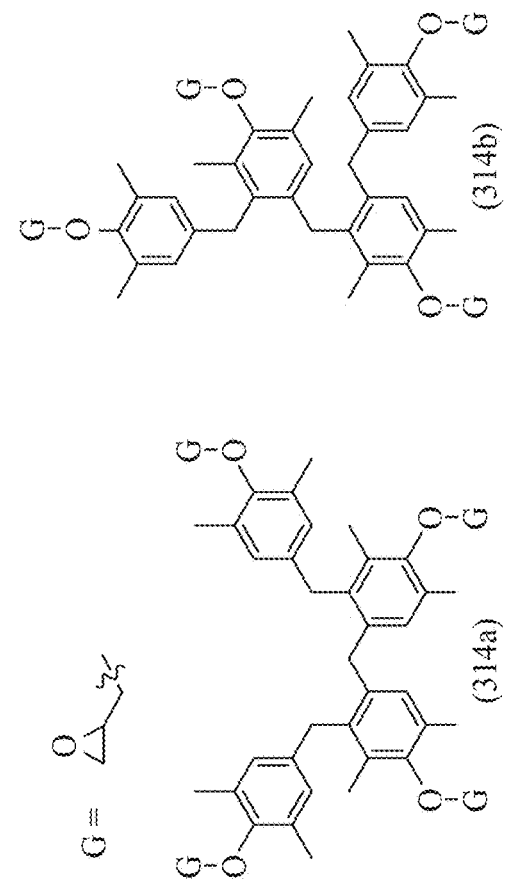
FIG. 3B shows examples of one or more additional components that can be formed during processes for forming tetramethyl bisphenol F diglycidyl ether (TMBPF-DGE) according to at least one embodiment of the present disclosure.

When used for the second composition 202, the term "lights" includes components of second composition 202 that have a boiling point lower than that of the glycidated bisphenol formed at operation 102. Examples of lights that can be part of the second composition 202 can comprise, consist of, or consist essentially of glycidated 2,6-xylenol, glycidated 2,4-xylenol, glycidated o-cresol, glycidated p-cresol, glycidated o-ethylphenol, or combinations thereof. When used for the second composition 202, the term "heavies" includes components of the second composition 202 that have a boiling point higher than that of the glycidated bisphenol formed at operation 102. Heavies of the second composition 202 can include components having a higher boiling point than the glycidated bisphenol and that are not glycidated trimers and glycidated tetramers, such as glycidated higher oligomers. Examples of glycidated trimers and glycidated tetramers that can be part of the second composition 202 include hexamethyl trisphenol F triglycidyl ether 312 (an example trimer also called a trisphenol) and octamethyl tetraphenol F tetraglycidyl ether 314a, 314b (example tetramers, also called tetrakisphenols) as shown in FIG. 3B. These glycidated trimers and glycidated tetramers can be formed during processes for forming TMBPF-DGE. In FIG. 3B, the wavy bond represents a connection to an oxygen atom.

Embodiments described above with respect to FIGS. 2, 3A, and 3B are shown for illustrative purposes and are not intended to be limiting. For example, The TMBPF-DGE resin is an illustrative, but non-limiting, example of an epoxy resin composition that can be formed according to one or more embodiments described herein. Likewise phenols other than 2,6-xylenol, associated bisphenols, and associated glycidated bisphenols can be utilized or formed according to one or more embodiments described herein. For example, phenols such as syringol, the associated bissyringol, and associated gycidated bissyringols can be utilized or formed by embodiments described herein. As another example, pheols such as eugenol, the associated biseugenol, and associated gycidated biseugenols can be utilized or formed by embodiments described herein.

Conventional technologies and methods for forming resin compositions (such as epoxy resin compositions) are not integrated or even lack the capability of being integrated. Here, with respect to the synthesis of TMBPF-DGE, conventional technologies require converting a TMBPF slurry into a pure and dry powder prior to forming the TMBPF-DGE. Such separation, purification, and drying operations are inefficient and costly. Further, the pure and dry powder of TMBPF must then be fed to a reactor to form the TMBPF-DGE. These and other deficiencies of conventional methods are further described below with respect to FIG. 4. In contrast, embodiments of the integrated process 100 described herein can be free of separation operations, purification operations, drying operations, and combinations thereof along path 103 between the production of TMBPF (in operation 101) and the production of TMBPF-DGE (in operation 102).

In some embodiments, operation 101 and operation 102 can be performed in the same reactor or in different reactors. As a non-limiting example, when catalyst 215 is sodium hydroxide (NaOH), at least a portion of the NaOH remaining after formation of first composition 201 can be used during the glycidation (for example, conversion conditions 235) to form the second composition 202. This example further illustrates unique advantages of the integrated process described herein.

Figure 4:
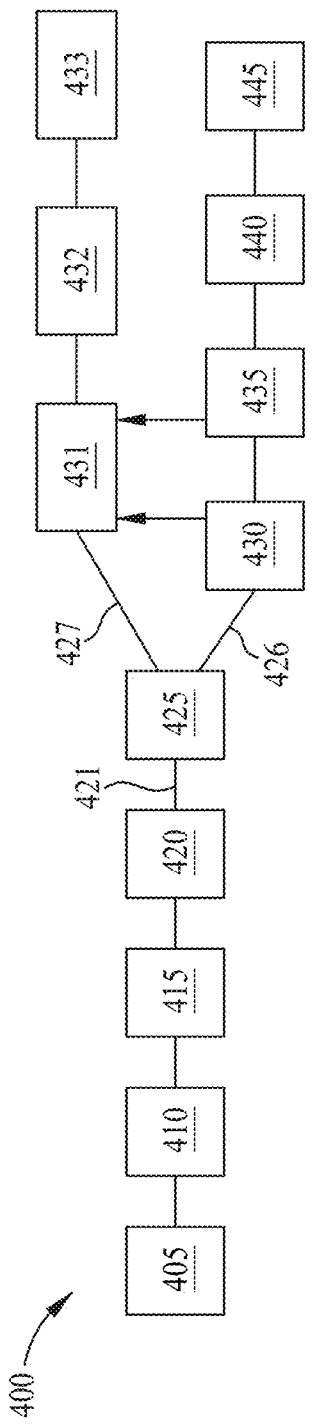
FIG. 4 is a flow diagram illustrating a conventional process for forming TMBPF.

FIG. 4 is a flow diagram illustrating a conventional process 400 for forming TMBPF. The conventional process 400 includes mixing 2,6-xylenol, catalyst, and solvent to form a mixture at step 405. Formaldehyde is then added to the mixture over about 50 minutes at step 410, as TMBPF crystallizes and a slurry is formed. Here, conventional techniques for production of bisphenols (in this example, TMBPF) require excess monophenol (in this example 2,6-xylenol). Some conventional techniques also either discard the remaining monophenol, or purify and recycle remaining monophenol (for example, in one or more of steps 425, 431, or 432). In contrast, processes described herein can be performed such that excess formaldehyde is used. Here, the excess formaldehyde can be simply removed by boiling or evaporation.

The conventional process 400 further includes a post-reaction period 415 between the period after all of the formaldehyde has been dosed to the reactor until the conclusion of the reaction. The slurry is then cooled at step 420 in preparation for further processing to form a pure, dry powder of TMBPF. A solid-liquid separation of the slurry exiting line 421 is performed at step 425 to separate the solid fractions exiting line 426 from the liquid fractions exiting line 427. The solid fractions exiting line 426 is further washed with water or other solvent at least twice (steps 430, 435) to remove residual solvent from the solid fractions. The water/solvent from the washing steps is added to the liquid fractions exiting line 427 and the resulting solvent water mixture is separated at step 431. The solvent fraction formed from step 431 undergoes solvent evaporation to remove residual components such as by-products or reactants (for example 2,6-xylenol), and then the solvent is recycled at step 433. After washing of the solid fractions at steps 430, 435, the solid is dried at step 440 into a pure, dry powder of TMBPF. The pure, dry powder of TMBPF is then discharged from the processing unit at step 445.

Overall, this conventional process 400 for forming bisphenols (for example, TMBPF) is inefficient and costly. For example, prior to its use in the production of resins, the slurry exiting line 421 must be converted to a pure and dry powder of TMBPF. Here and in order to form the pure and dry powder of TMBPF, the slurry is subjected to various purification operations such as a solid-liquid separation (in step 425) and washings (in step 430 and in step 435), with subsequent drying (in step 440). In addition, the pure and dry powder of TMBPF formed at step 440 must be discharged (in step 445) from a reactor prior to subsequent processing such as production of epoxy resins including TMBPF-DGE. Further, feeding of this pure and dry powder of TMBPF is time-intensive and challenging due to the difficulty of moving and handling.

Figure 5:
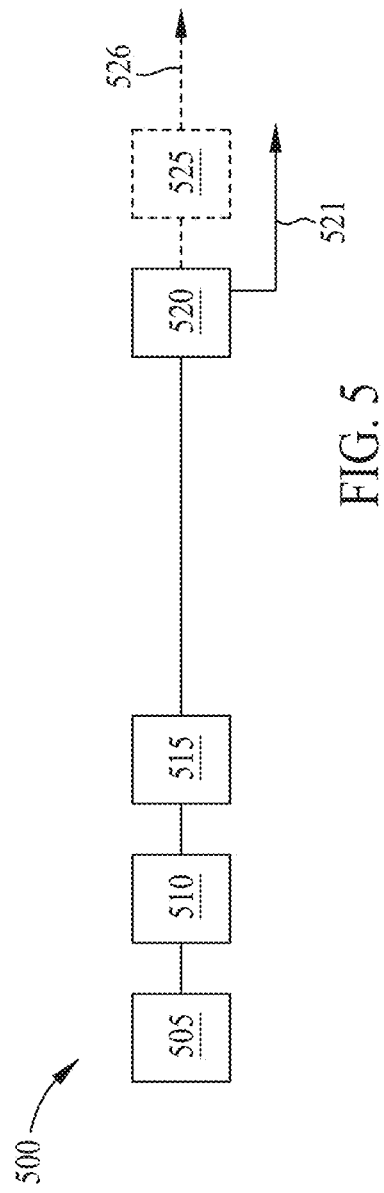
FIG. 5 is a flow diagram illustrating a process for forming TMBPF according to at least one embodiment of the present disclosure.

FIG. 5 is a flow diagram illustrating a process 500 for forming TMBPF according to at least one embodiment of the present disclosure. Although embodiments of the process 500 are described with reference to TMBPF and TMBPF-DGE, other bisphenols and resin compositions are contemplated. For example, bisphenol A (BPA) can be made using acetone. As described, and in contrast to conventional technologies, the process for forming bisphenols as described herein can be free of various purification operations such as a solid-liquid separation (for example, step 425 described above), washings (for example, step 430 and step 435 described above), and subsequent drying (for example, step 440 described above). In addition, and unlike conventional technologies which convert the TMBPF slurry exiting line 421 to a pure and dry powder, the product mixture comprising the bisphenol (for example TMBPF) does not require discharging from a reactor (for example, step 445 described above) prior to subsequent processing such as production of epoxy resins including TMBPF-DGE.

Process 500 includes mixing 2,6-xylenol, catalyst, and solvent to form a mixture at operation 505. Formaldehyde (or other aldehydes or ketones) is then added to the mixture at operation 510, as TMBPF crystallizes and a product mixture comprising the TMBPF is formed. A stoichiometric excess of formaldehyde is used. In such cases, the excess formaldehyde can be easily removed by boiling, evaporation, distillation, or combinations at operation 520. Use of the stoichiometric excess of formaldehyde for bisphenol formation contrasts conventional technologies where excess monophenol is used during bisphenol. As a result, embodiments described herein can be free of purifying and recycling processes to remove excess monophenol. Although embodiments of the present disclosure are described with respect to formaldehyde, it is contemplated that other aldehydes, as well as ketones, can be used, as further described below. For example, BPA can be made using acetone as the ketone. In addition, when a ketone is used to make a bisphenol, the ketone is used in a stoichiometric excess relative to the monophenol.

Process 500 further includes a post-reaction period 515. The post-reaction period is the period after all of the formaldehyde has been dosed or added to the reactor until the conclusion of the reaction or until the reaction is deemed complete. The process 500 further includes removing, for example, water and formaldehyde at operation 520. The removal process of operation 520 can be performed by suitable techniques such as distillation, though other techniques are contemplated. As described above, the product mixture comprising the bisphenol (for example, TMBPF) can be in the form of a slurry with the bisphenol partially or completely dissolved. At this stage, the bisphenol (for example, TMBPF) can be used for subsequent processing such as glycidation to form TMBPF-DGE (in operation 102), depending on the catalyst used at operation 505.

When the catalyst used to form the bisphenol (for example, TMBPF) is a base catalyst, the product mixture comprising TMBPF then exits operation 520 by line 521 can be used as-is for subsequent processing such as TMBPF-DGE formation (for example, operation 102). When the catalyst utilized to form the bisphenol is an acid catalyst, the acid catalyst can be removed, neutralized, or combinations thereof by optional operation 525. The removal process of optional operation 525 can be performed by heating, distillation, introduction of a base to neutralize or quench the acid, or combinations thereof, to form a product mixture comprising TMBPF exiting operation 525 by line 526 ready for subsequent processing if desired.

For example, when oxalic acid is utilized to form the bisphenol, the oxalic acid decomposes to light gases at temperatures of about 160° C. or more. Such light gases can include carbon dioxide, carbon monoxide, methanoic acid, water, or combinations thereof, depending on the conditions. In this example, the reaction product comprising the bisphenol can be heated during optional operation 525 in order to decompose the oxalic acid. When an inorganic acid such as hydrochloric acid is utilized to form the bisphenol, the hydrochloric acid can be removed by distillation during optional operation 525. Additionally, or alternatively, an inorganic acid can be neutralized by a base, such as sodium hydroxide to form a salt, such as sodium chloride, during optional operation 525. Unlike conventional methods, the presence of the resulting salt, such as sodium chloride, in the reaction product comprising the bisphenol is acceptable for further processing such as glycidation (for example, operation 102).

Overall, embodiments of the process 500 to form a bisphenol (for example TMBPF) that is usable for further processing is a significant improvement over conventional process 400 as it is much simpler. Further, embodiments of the process 500 can be integrated with subsequent processing (for example, operation 102) such as glycidation, acrylation, acylation, alkylation, or any suitable reaction. Here, for example, the product mixture comprising TMBPF formed during process 500 can be directly used for the formation of TMBPF-DGE. That is, the synthesis of TMBPF can be easily integrated with the synthesis of TMBPF-DGE permitting an integrated process to form TMBPF-DGE from 2,6-xylenol.

Process for Forming Bisphenol Monomers

Figure 6A:
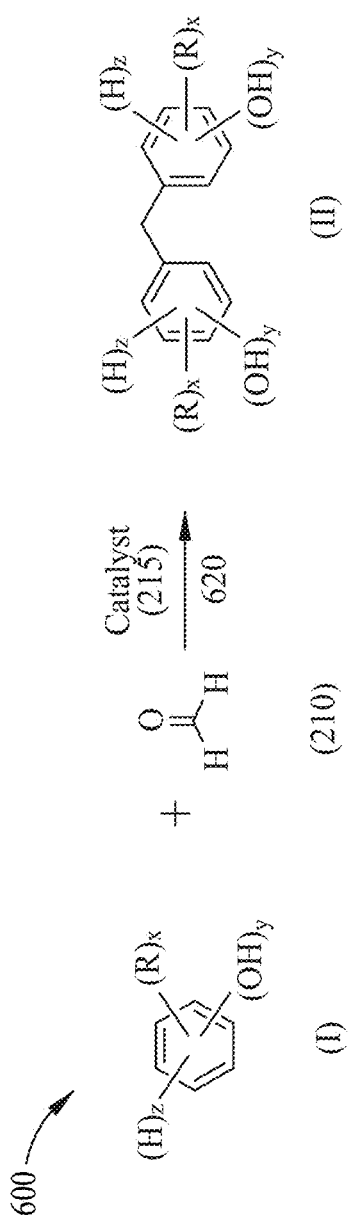
FIG. 6A shows a non-limiting reaction diagram for forming a bisphenol according to at least one embodiment of the present disclosure.

Embodiments described herein also generally relate to processes for forming bisphenols. The process generally includes reacting a mixture of a formaldehyde (or a source of formaldehyde), a catalyst, and at least one phenol, under reaction conditions, to form a reaction product that includes a bisphenol. FIG. 6A shows a reaction diagram 600 for forming a bisphenol of formula (II) from one or more phenol of formula (I). The reaction diagram 600 is only an example and is not limiting. As described above, formation of the bisphenol of formula (II) occurs with a formaldehyde 210, and a catalyst 215 under reaction conditions 620 to form a reaction product that includes a bisphenol of formula (II). The reaction, which can be referred to as a condensation reaction, produces water.

Although embodiments of the present disclosure are described with respect to formaldehyde, it is contemplated that other aldehydes, as well as ketones, can be used, as further described below with respect to aldehydes and ketones of formula (III).

Suitable phenols that can be used as the at least one phenol include those represented by formula (I):

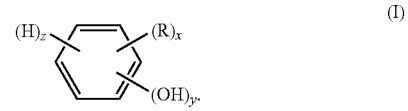

The phenol of formula (I) includes at least one hydrogen atom (H), such that z is at least one. In formula (I), R is a group substituted for a hydrogen atom on the aromatic ring, and OH is a hydroxyl substituted for a hydrogen atom on the aromatic ring.

In some embodiments, z is from 1 to 4, such as 1, 2, 3, or 4; x is from 1 to 4 (such as 1, 2, 3, or 4); y is from 1 to 4 (such as 1, 2, 3, or 4); and combinations thereof. A total of x, y, and z on the aromatic ring of formula (I) is 6. When x is more than 1, each R group can be the same or different.

Each R group of formula (I) can be an unsubstituted hydrocarbyl, a substituted hydrocarbyl, or a functional group comprising at least one element from Group 13-17 of the periodic table of the elements. When an R group is a functional group comprising at least one element from Group 13-17, the R group can be halogen (F, Cl, Br, or I), O, N, Se, Te, P, As, Sb, S, B, Si, Ge, Sn, Pb, and the like, such as C(O)R*, C(C)NR*$_2$, C(O)OR*, NR*$_2$, OR*, SeR*, TeR*, PR*$_2$, AsR*$_2$, SbR*$_2$, SR*, SO$_x$ (where x=2 or 3), BR*$_2$, SiR*$_3$, GeR*$_3$, SnR*$_3$, PbR*$_3$, and the like, where R* is, independently, hydrogen or unsubstituted hydrocarbyl, or where at least one heteroatom has been inserted within the unsubstituted hydrocarbyl.

Each R group of formula (I) can have, independently, any suitable number of carbon atoms such as from 1 to 20 carbon atoms, such as from 1 to 10 carbon atoms, such as from 1 to 5 carbon atoms, such as from 1 to 4 carbon atoms. In some embodiments, the number of carbon atoms in each R group of formula (I) can be, independently, 1, 2, 3, 4, 5, 6, 7, 8, 9, 10, 11, 12, 13, 14, 15, 16, 17, 18, 19, or 20. Each of the foregoing numbers can be preceded by the word "about," "at least about," "less than about," or "more than about," and any of the foregoing numbers can be used singly to describe an open-ended range or in combination to describe a close-ended range. Each R group of formula (I) can be, independently, linear or branched, saturated or unsaturated, cyclic or acyclic, aromatic or not aromatic. Regarding saturation, each R group of formula (I) can be, independently, fully saturated, partially unsaturated, or fully unsaturated.

In some examples, one or more R groups of formula (I) can be an unsubstituted hydrocarbyl. An "unsubstituted hydrocarbyl" refers to a group that consists of hydrogen and carbon atoms only. Non-limiting examples of unsubstituted hydrocarbyl include an alkyl group having from 1 to 20 carbon atoms such as methyl, ethyl, n-propyl, isopropyl, n-butyl, iso-butyl, sec-butyl, and tert-butyl, pentyl, hexyl, heptyl, octyl, ethyl-2-hexyl, isooctyl, nonyl, n-decyl, iso-decyl, or isomers thereof, a cycloaliphatic group having from 3 to 20 carbon atoms such as, for example, cyclopentyl or cyclohexyl; an aromatic group having from 6 to 20 carbon atoms such as, for example, phenyl or naphthyl; or any combination thereof. In some embodiments, one or more R groups of formula (I) can be a linear or branched alkenyl having from 1 to 20 carbon atoms, such as from 3 to 10 carbon atoms. The term "alkenyl" refers to a hydrocarbyl having at least one double bond. An illustrative, but non-limiting example of alkenyl includes allyl (for example, —CH$_2$CH=CH$_2$).

In some embodiments, one or more R groups of formula (I) can be a substituted hydrocarbyl. A "substituted hydrocarbyl" refers to an unsubstituted hydrocarbyl in which at least one hydrogen of the unsubstituted hydrocarbyl has been substituted with at least one heteroatom or heteroatom-containing group, such as one or more elements from Group 13-17 of the periodic table of the elements, such as halogen (F, Cl, Br, or I), O, N, Se, Te, P, As, Sb, S, B, Si, Ge, Sn, Pb, and the like, such as C(O)R*, C(C)NR*$_2$, C(O)OR*, NR*$_2$, OR*, SeR*, TeR*, PR*$_2$, AsR*$_2$, SbR*$_2$, SR*, SO$_x$ (where x=2 or 3), BR*$_2$, SiR*$_3$, GeR*$_3$, SnR*$_3$, PbR*$_3$, and the like, where R* is, independently, hydrogen or unsubstituted hydrocarbyl, or where at least one heteroatom has been inserted within the unsubstituted hydrocarbyl.

Non-limiting examples of substituted hydrocarbyls include —OR*, where the oxygen atom is connected to the ring and where R* can include 1 to 10 carbon atoms, such as 1 to 5 carbon atoms, such as 2 to 4 carbon atoms. For example, —OR* can be alkyloxy such as methoxy, ethyoxy, propoxy, butoxy, and isomers thereof.

In some embodiments, each R group of formula (I) is a group that is non-reactive with an epoxide-bearing reactant. For example, and in at least one embodiment, each R group of formula (I) is, independently, —(C1-C5)alkyl or —O(C1-C5)alkyl.

In at least one embodiment, the phenol of formula (I) is a monophenol (y is 1).

In formula (I), and in some embodiments, at least one R group is located at an ortho position on the aromatic ring relative to the hydroxyl group. In certain embodiments, an R group is located at each ortho position on the ring relative to the hydroxyl group.

Illustrative, but non-limiting, examples of phenols of formula (I) include 2,6-xylenol (formula (Ia)), 2,6-diethylphenol (formula (Ib), 2,6-diisopropylphenol (formula (Ic)), 2,6-di-tert-butylphenol (formula (Id)), 2,6-dimethoxyphenol (formula (Ie); also known as syringol), 2,6-diethoxyphenol (formula (If)), 2-methoxy-4-prop-2-enylphenol (formula (Ig); also known as eugenol), among others:

(Ia)

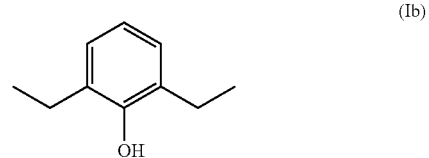

(Ib)

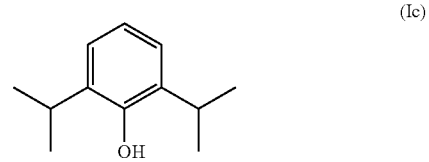

(Ic)

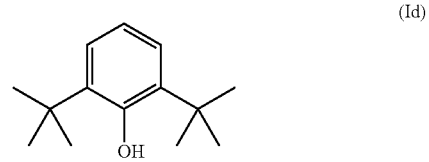

(Id)

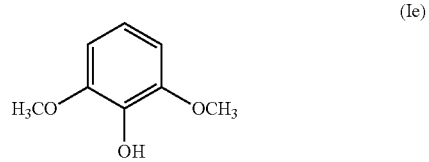

(Ie)

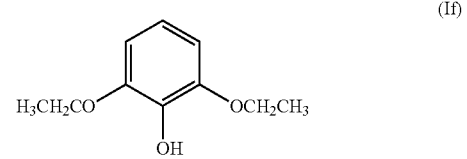

(If)

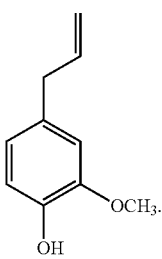

(Ig)

As used herein, reference to a chemical, an R group, alkyl, substituted alkyl, hydrocarbyl, or substituted hydrocarbyl without specifying a particular isomer (such as butyl) expressly discloses all isomers (such as n-butyl, iso-butyl, sec-butyl, and tert-butyl). For example, reference to an R group having 4 carbon atoms expressly discloses all isomers thereof. When a compound is described herein such that a particular isomer, enantiomer or diastereomer of the compound is not specified, for example, in a formula or in a chemical name, that description is intended to include each isomer and enantiomer of the compound described individual or in any combination.

The formaldehyde reacts with the at least one phenol of formula (I) to form a methylene unit positioned between two of the phenylene rings as shown in the bisphenol of formula (II):

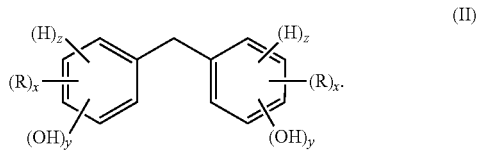

(II)

In formula (II), each H is a hydrogen atom on the aromatic ring; each R is a group substituted for a hydrogen atom on the aromatic ring; each OH is a hydroxyl group substituted for a hydrogen atom on the aromatic ring; each x is from 1 to 4, and each x is the same or different; each y is from 1 to 4, and each y is the same or different; and each z is from 0 to 4. Suitable R groups are described above.

Besides formaldehyde, paraformaldehyde (($CH_2O)_n$) can be used as a source of formaldehyde. Additionally, or alternatively, formalin (an aqueous solution of formaldehyde) can be utilized as a source of formaldehyde. In some embodiments, the formaldehyde (or source of formaldehyde) is introduced to a mixture comprising at least one phenol of formula (I). The mixture comprising at least one phenol of formula (I) can also include solvent, catalyst, or both, among other components.

Other aldehydes, as well as ketones, are also contemplated, such as those represented by formula (III):

(III)

In formula (III), each of $R^a$ and $R^b$ can be, independently, hydrogen, an unsubstituted hydrocarbyl, a substituted hydrocarbyl, or a functional group comprising at least one element from Group 13-17 of the periodic table of the elements. Suitable R groups for each of $R^a$ and $R^b$ formula (III) can include those described above with respect to formula (I). Non-limiting examples of unsubstituted hydrocarbyl include an alkyl group having from 1 to 20 carbon atoms such as methyl, ethyl, n-propyl, isopropyl, n-butyl, iso-butyl, sec-butyl, and tert-butyl, pentyl, hexyl, heptyl, octyl, ethyl-2-hexyl, isooctyl, nonyl, n-decyl, isodecyl, or isomers thereof, a cycloaliphatic group having from 3 to 20 carbon atoms such as, for example, cyclopentyl or cyclohexyl; an aromatic group having from 6 to 20 carbon atoms such as, for example, phenyl or naphthyl; or any combination thereof.

Each of $R^a$ and $R^b$ of formula (III) can have, independently, any suitable number of carbon atoms such as from 1 to 20 carbon atoms, such as from 1 to 10 carbon atoms, such as from 1 to 5 carbon atoms, such as from 1 to 4 carbon atoms. In some embodiments, the number of carbon atoms in each of $R^a$ and $R^b$ of formula (III) can be, independently, 1, 2, 3, 4, 5, 6, 7, 8, 9, 10, 11, 12, 13, 14, 15, 16, 17, 18, 19, or 20. Each of the foregoing numbers can be preceded by the word "about," "at least about," "less than about," or "more than about," and any of the foregoing numbers can be used singly to describe an open-ended range or in combination to describe a close-ended range. Each of $R^a$ and $R^b$ of formula (III) group can be, independently, linear or branched, saturated or unsaturated, cyclic or acyclic, aromatic or not aromatic. Regarding saturation, each of $R^a$ and $R^b$ of formula (III) can be, independently, fully saturated, partially unsaturated, or fully unsaturated.

Illustrative, but non-limiting, examples of aldehydes include formaldehyde, acetaldehyde, crotonaldehyde, pentanal, butanal, 3-methyl-butenal, acrolein, benzaldehyde, furfural, glyoxal, derivatives thereof, and combinations thereof.

Illustrative, but non-limiting examples of ketones include propanone (acetone), acetophenone (methyl phenyl ketone), benzophenone (diphenyl ketone), 2-pentanone (methyl propyl ketone), 3-methyl-2-butanone (methyl isopropyl ketone), 3-hexanone (ethyl propyl ketone), derivatives thereof, and combinations thereof.

The catalyst 215 can include any suitable acid catalyst or base catalyst such as Brønsted acids and Brønsted bases. Illustrative, but non-limiting, examples of the catalyst 215 include organic acids, inorganic acids, or combinations thereof. Organic acids include, but are not limited to, methanesulfonic acid, p-toluenesulfonic acid, trifluoroacetic acid, oxalic acid (CAS No. 144-62-7), or combinations thereof, among others. Non-limiting examples of inorganic acids include hydrochloric acid, sulfuric acid, phosphoric acid, or combinations thereof, among others. Acid catalysts can be removed by heating the reaction product comprising the bisphenol of formula (II) at high temperatures. For example, oxalic acid decomposes to carbon dioxide at temperatures of about 160° C. or more, for example, about 165° C. or more. Additionally, or alternatively, acid catalysts can also be removed from the reaction product comprising the bisphenol of formula (II) by distillation of the reaction product, by neutralization with sodium hydroxide (NaOH), or combinations thereof. The salt formed after neutralization of the acid (for example, sodium chloride (NaCl)) is suitable for subsequent reactions on the bisphenol 105 such as glycidation reactions.

Non-limiting examples of base catalysts include sodium hydroxide, potassium hydroxide, sodium carbonate, sodium hydrogen carbonate, sodium bicarbonate, potassium carbonate, potassium bicarbonate, basic amines, or combinations thereof. The base catalyst used can be an aqueous solution of about 5% to about 50% by weight, such as about 10% to about 40% by weight, such as about 20% to about 30% by weight.

The mixture comprising the at least one phenol of formula (I) can also include one or more solvents. Suitable solvents include an organic solvent. Organic solvents can include, but are not limited to aliphatic hydrocarbons, cycloaliphatic hydrocarbons, aromatic hydrocarbons, alcohols, ethers, esters, nitriles, or combinations thereof. Illustrative, but non-limiting, examples of organic solvents include tert-butylbenzene (tBB), toluene, ethylbenzene, xylene (one or more of 1,2-dimethylbenzene, 1,3-dimethylbenzene, or 1,4-dimethylbenzene), 1,3,5-trimethylbenzene (also known as mesitylene), decane, the monomethyl ether of diethylene glycol, ethylene glycol of monobutyl ether, tetrahydrofuryl alcohol, ethylene glycol monomethyl ether, ethyl acetate, isopropyl acetate, butyl acetate, amyl acetate, isomers thereof, or combinations thereof. Other solvents are contemplated. In some embodiments, the organic solvent includes tert-butylbenzene (tBB), toluene, ethylbenzene, a xylene, 1,3,5-trimethylbenzene, isomers thereof, or mixtures thereof.

In some embodiments, the solvent can be selected based on a boiling point that can be utilized to remove or neutralize the catalyst used. For example, the solvent can be selected to have a boiling point at 1 bara (100 kPa (absolute)) of about 100° C. or more in order to decompose or neutralize an acid or base. As a non-limiting example, solvents boiling between about 160° C. and about 170° C. (such as tert-butylbenzene, 1,3,5-trimethylbenzene, or other solvents) can be utilized with oxalic acid catalyst, and after formation of the bisphenol, the oxalic acid can be removed from the bisphenol/solvent/oxalic acid mixture at temperatures of about 165° C. to about 170° C. Heating at this temperature results in decomposition and sublimation of oxalic acid.

In some examples, the solvent can have a boiling point (at 1 bara (100 kPa (absolute))) that is from about 100° C. to about 210° C., such as from about 110° C. to about 200° C., such as from about 120° C. to about 190° C., such as from about 130° C. to about 180° C., such as from about 140° C. to about 170° C., such as from about 150° C. to about 160° C. or from about 165° C. to about 170° C. In at least one embodiment, a boiling point of the solvent (at 1 bara (100 kPa (absolute)); units of ° C.) can be 100, 105, 110, 115, 120, 125, 130, 135, 140, 145, 150, 155, 160, 165, 170, 175, 180, 185, 190, 195, or 200, or ranges thereof. Each of the foregoing numbers can be preceded by the word "about," "at least about," "less than about," or "more than about," and any of the foregoing numbers can be used singly to describe an open-ended range or in combination to describe a close-ended range.

A total amount of components except for solvent in the mixture (the total amount of the formaldehyde, the catalyst, and the at least one phenol) is based on a percent dry weight basis and the total amount of the formaldehyde, the catalyst, and the at least one phenol does not exceed 100 wt %.

A total amount of the at least one phenol of formula (I) used for the reaction to form the bisphenol of formula (II) can be from about 74 wt % to about 86 wt %, such as from about 76 wt % to about 85 wt %, such as from about 78 wt % to about 82 wt %, based on the total wt % of the at least one phenol, formaldehyde, and catalyst. In some embodiments, a total amount (wt %) of the at least one phenol of formula (I) used for the reaction to form the bisphenol of formula (II) can be 74, 75, 76, 77, 78, 79, 80, 81, 82, 83, 84, 85, or 86, or ranges thereof, though other amounts are contemplated. Each of the foregoing numbers can be preceded by the word "about," "at least about," "less than about," or "more than about," and any of the foregoing numbers can be used singly to describe an open-ended range or in combination to describe a close-ended range.

An amount of formaldehyde used for the reaction to form the bisphenol of formula (II) can be from about 11 wt % to about 23 wt %, such as from about 12 wt % to about 21 wt %, such as from about 15 wt % to about 19 wt %, based on the total wt % of the formaldehyde, the catalyst, and the at least one phenol. In some embodiments, a total amount (wt %) of formaldehyde used for the reaction to form the bisphenol of formula (II) can be 11, 12, 13, 14, 15, 16, 17, 18, 19, 20, 21, 22, or 23, or ranges thereof, though other amounts are contemplated. Each of the foregoing numbers can be preceded by the word "about," "at least about," "less than about," or "more than about," and any of the foregoing numbers can be used singly to describe an open-ended range or in combination to describe a close-ended range.

A total amount of catalyst used for the reaction to form the bisphenol of formula (II) can be from about 0.6 wt % to about 14 wt %, such as from about 1.25 wt % to about 7 wt %, such as from about 2.5 wt % to about 3.5 wt %, based on the total wt % of the formaldehyde, the catalyst, and the at least one phenol. In some embodiments, a total amount (wt %) of catalyst used for the reaction to form the bisphenol of formula (II) can be 0.6, 1, 1.25, 1.5, 2, 2.5, 3, 3.5, 4, 4.5, 5, 6, 7, 8, 9, 10, 11, 12, 13, or 14, or ranges thereof, though other amounts are contemplated. Each of the foregoing numbers can be preceded by the word "about," "at least about," "less than about," or "more than about," and any of the foregoing numbers can be used singly to describe an open-ended range or in combination to describe a close-ended range.

A weight ratio of solvent to the at least one phenol of formula (I) used for the reaction to form the bisphenol of formula (II) can be from about 0.7 to about 1.6, such as from about 0.75 to about 1.3, such as from about 0.8 to about 1. In some embodiments, a weight ratio of solvent to the at least one phenol of formula (I) used for the reaction to form the bisphenol of formula (II) can be 0.7, 0.75, 0.8, 0.85, 0.9, 0.95, 1, 1.05, 1.1, 1.15, 1.2, 1.25, 1.3, 1.35, 1.4, 1.45, 1.5, 1.55, or 1.6, or ranges thereof, though other amounts are contemplated. Each of the foregoing numbers can be preceded by the word "about," "at least about," "less than about," or "more than about," and any of the foregoing numbers can be used singly to describe an open-ended range or in combination to describe a close-ended range.

The reaction of monophenol and aldehyde (or ketone) to form a bisphenol has a stoichiometric ratio of monophenol to aldehyde (or ketone) of 2:1. However, according to the present disclosure, a stoichiometric excess of aldehyde (or ketone) as compared to monophenol is present in the reaction.

The amount of aldehyde (or ketone) used for the reaction is at a stoichiometric excess relative to the monophenol, such as from about 1.05 to about 5 stoichiometric molar excess of aldehyde (or ketone), such as from about 1.5 to about 4 stoichiometric excess of aldehyde (or ketone) to monophenol, such as from about 1.75 to about 3 stoichiometric excess of aldehyde (or ketone) to monophenol, such as from about 2 to about 2.5 stoichiometric excess of aldehyde (or ketone) to monophenol, though other stoichiometric excesses are contemplated. In at least one example, a 1.5 to about 2 stoichiometric excess of aldehyde (or ketone) to monophenol is utilized, such as from about 1.6 to about 1.9, such as from about 1.7 to about 1.8, such as from about 1.7 to about 1.75 or from about 1.75 to about 1.8, such as about 1.75. Any of the foregoing numbers can be used singly to describe an open-ended range or in combination to describe a close-ended range. As described above, when a ketone is used to make a bisphenol, the ketone is used in stoichiometric excess relative to the monophenol. Accordingly, the aforementioned stoichiometric excesses can apply when using ketones.

The stoichiometric excess of formaldehyde (or ketone) can permit high conversion of the at least phenol of formula (I) to the reaction product comprising the bisphenol of formula (II). The use of a stoichiometric excess of formaldehyde (or ketone) also stands in contrast to conventional methods of forming bisphenols such as TMBPF. Here, prior methods for forming bisphenols such as TMBPF use excess phenol which requires washing or other purification techniques (such as a high-energy distillation) to remove the phenol after the reaction. In addition, the use of stoichiometric excess of formaldehyde (or ketone) described herein permits embodiments described herein to be free of operations to recycle the phenol of formula (I). It is contemplated that recycling operations can be performed if desired. Further, the choice of solvent can permit removal of the excess formaldehyde (or ketone) and water by distillation without losing substantial amounts of solvent. The choice of solvent can also allow thermal decomposition of the catalyst used.

In some embodiments, formaldehyde can be used as an aqueous solution (for example, formalin) having a concentration of about 10% to about 60% by weight, such as an aqueous solution having a concentration of about 20% to about 50% by weight, such as most as an aqueous solution having a concentration of about 30% to about 40% by weight. In some embodiments, paraformaldehyde is used.

A molar ratio of a total amount of catalyst to a total amount of the at least one phenol can be from about 0.005 to about 0.5, such as from about 0.01 to about 0.24, such as from about 0.02 to about 0.12, such as from about 0.04 to about 0.06, such as from about 0.045 to about 0.055, such as about 0.05, though other molar ratios are contemplated. In some embodiments, a molar ratio of a total amount of catalyst to a total amount of the at least one phenol can be 0.005, 0.01, 0.015, 0.02, 0.03, 0.04, 0.05, 0.06, 0.07, 0.08, 0.09, 0.1, 0.15, 0.2, 0.25, 0.3, 0.35, 0.4, 0.45, or 0.5, or ranges thereof. Each of the foregoing numbers can be preceded by the word "about," "at least about," "less than about," or "more than about," and any of the foregoing numbers can be used singly to describe an open-ended range or in combination to describe a close-ended range.

The bisphenol of formula (II) can be made by feeding the at least one phenol of formula (I), formaldehyde 210, catalyst 215, and solvent to a reactor. The resultant mixture can be reacted under reaction conditions 620 effective to form the bisphenol of formula (II). In some examples, the at least one phenol of formula (I), catalyst 215, and solvent are first fed to the reactor, and the formaldehyde 210 is dosed to the reactor at suitable rates to form the bisphenol of formula (II).

Reaction conditions 620 can include a dosing time (or injection time), a post-dosing time (or a post-injection time), and a total reaction time. The dosing time is the period over which the formaldehyde 210 is dosed into the reactor. The dosing time can be about 30 minutes to about 20 hours, such as from about 40 minutes to about 10 hours, such as from about 50 minutes to about 2 hours, though other periods are contemplated.

The post-reaction time of reaction conditions 620 is the period after all of the formaldehyde is dosed into the reactor to the conclusion of the reaction. The conclusion of the reaction can be based the time point at which a certain percent conversion of the at least one phenol has occurred. For example, the post reaction time of reaction conditions 620 can be the amount of time between the conclusion of the dosing time and the point at which about 90% or more conversion of the at least one phenol has occurred, such as about 91% or more conversion, such as about 92% or more conversion, such as about 93% or more conversion, such as about 94% or more conversion, such as about 95% or more conversion, such as about 96% or more conversion, such as about 97% or more conversion, such as about 98% or more conversion, such as about 99% or more conversion, such as about 99.9% or more conversion, such as about 100% conversion. The post-reaction time can correspond to post-reaction period 515 of FIG. 5. The total reaction time of reaction conditions 620 is the sum of the dosing time and the post-reaction time. The total reaction time of reaction conditions 620 can be from about 1 hour to about 40 hours, such as about 10 hours to about 25 hours, such as from about 15 hours to about 20 hours, though other periods are contemplated.

Reaction conditions 620 can include a reactor temperature that is from about 50° C. to about 200° C., such as from about 70° C. to about 120° C., such as from about 90° C. to about 100° C., though other temperatures are contemplated. The reactor temperature can be the temperature (or temperature range) at which the reaction mixture boils, an azeotropic boiling point (or range) of water-solvent combination. In some examples, using tBB as solvent under atmospheric conditions, the reactor temperature can be from about 75° C. to about 100° C., such as from about 80° C. to about 96° C., such as about 96° C. Higher temperatures at higher pressures can result in shorter reaction time, but may also increase the amount of trimers, tetramers, and other heavies in the reaction product comprising the bisphenol of formula (II). Reactor temperature is the temperature monitored by a temperature probe.

Reaction conditions 620 can also include a reactor pressure as measured in units of absolute pressure. The reactor pressure can be from about 1 bara (about 100 kPa (absolute)) to about 4.5 bara (about 450 kPa (absolute)), such as from about 1.05 bara (about 105 kPa (absolute)) to about 1.8 bara (about 180 kPa (absolute)), such as from about 1.1 bara (about 110 kPa (absolute)) to about 1.2 bara (about 120 kPa (absolute)), though other pressures are contemplated. In at least one embodiment the reactor pressure of reaction conditions 620 can be from about 1 bara (about 100 kPa (absolute)) to about 1.8 bara (about 180 kPa (absolute)), such as from about 1 bara (about 100 kPa (absolute)) to about 1.2 bara (about 120 kPa (absolute)). The pressure (or pressure ranges) can be selected to match the temperature (or temperature ranges) in terms of the reaction mixture boiling for a pressure≥1 bara and a temperature≥96° C.

Other temperatures, times, and pressures are contemplated for the reaction conditions 620 and can be different depending on, for example, the at least one phenol, solvent, or catalyst utilized for the reaction. Conditions effective to form the bisphenol of formula (II) can include stirring, mixing, agitation, or combinations thereof. Conditions can optionally include utilizing a non-reactive gas, such as nitrogen, argon, or combinations thereof. For example, a reaction mixture comprising the at least one phenol, solvent, catalyst, and formaldehyde can be used with these or other non-reactive gases to degas various components or otherwise remove oxygen from the reaction mixture.

As described herein, the reaction product comprising the bisphenol of formula (II) can also include one or more optional reaction product components such as a trimer, a tetramer, lights, heavies, and combinations thereof. Water can also be formed or present in the reaction product. The lights are a reaction product component(s) having a boiling point lower than that of the desired bisphenol. The heavies are a reaction product component(s) having a boiling point higher than that of the desired bisphenol (excluding trimer (s), tetramer(s), or combinations thereof).

After the reaction is deemed complete (after, for example, the post-reaction time or post-reaction period 515), water and formaldehyde can be removed from reaction product comprising the bisphenol of formula (I). This removal of water and formaldehyde can correspond to operation 520 of FIG. 5. Removal of water and formaldehyde can be performed by, for example, distillation (under suitable conditions) of the reaction product comprising the bisphenol of formula (I), solvent, water, formaldehyde, among other optional components.

In some embodiments, the temperature at which the removal of water and formaldehyde occurs is performed at a temperature lower than the boiling point of the solvent. In cases where solvent evaporates or distills off while removing the formaldehyde and water, the solvent can be separated from the water phase in, for example, a phase separator of a condenser and phase separation vessel, and then returned to the reactor that includes the reaction product.

In some embodiments, the catalyst used to form the bisphenol of formula (II) can be removed, neutralized, or combinations thereof as described above with respect to optional operation 525. In at least one embodiment, such as when the catalyst is a base catalyst, the process is free of optional operation 525. Depending on, for example, the catalyst used to form the bisphenol, the product mixture comprising the bisphenol can be ready for subsequent processing (if desired) after operation 520 (for example, the product mixture comprising bisphenol exiting line 521), after optional operation 525 (for example, for example, the product mixture comprising bisphenol exiting line 526), or combinations thereof.

The product mixture comprising bisphenol formed after post-reaction period 515, operation 520, optional operation 525, or combinations thereof can correspond to first composition 201.

Figure 6B:
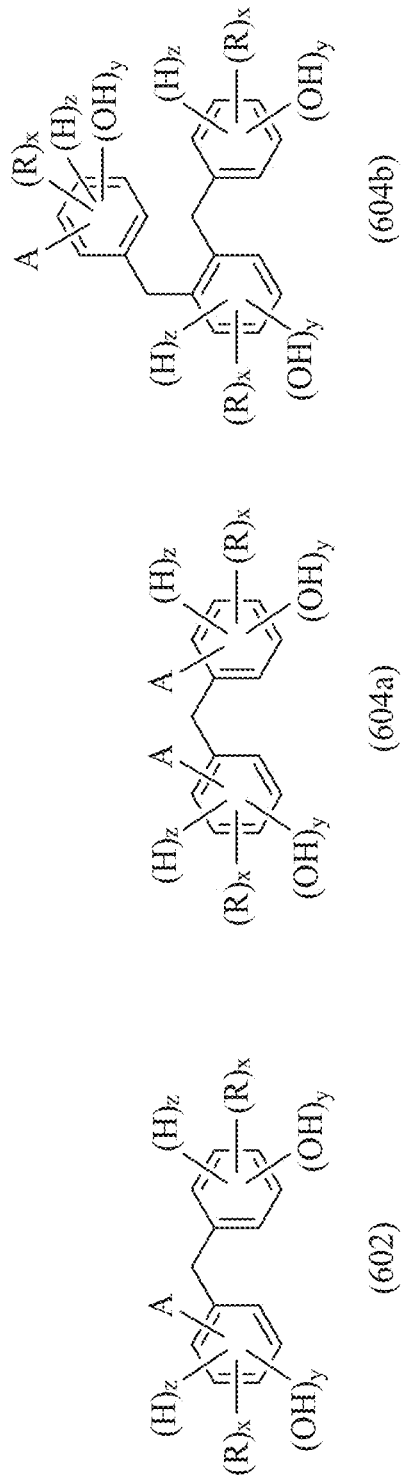
FIG. 6B shows examples of one or more additional components that can be formed during processes for forming a bisphenol according to at least one embodiment of the present disclosure.

As described herein, the reaction product comprising the bisphenol of formula (II) can include one or more additional components, such as a trimer, a tetramer, lights, and heavies. As shown in FIG. 6B, a trimer and a tetramer of the reaction product comprising the bisphenol of formula (II) can include a trimer 602, a tetramer 604a, a tetramer 604b, or combinations thereof. In the trimer 602, the tetramer 604a, the tetramer 604b, or combinations thereof, A is a group substituted for a hydrogen atom on the aromatic ring, and can be represented by the structure:

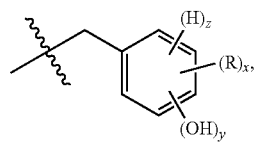

wherein:
where H, OH, R, x, y, and z are described above; and the wavy bond represents a connection to the aromatic ring.

Functionalized trimers in the reaction product or resin composition comprising the functionalized bisphenol of formula (II) can include a trimer where one or more of the oxygen atoms of the trimer is functionalized, such as 1, 2, or all 3 of the oxygen atoms of the trimer is functionalized. For example, a monoglycidated trimers, diglycidated trimers, and triglycidated trimers where an epoxy functionality is attached to only one, two, or three of the oxygen atoms, respectively, are contemplated.

Similarly, functionalized tetramers in the reaction product or resin composition comprising the functionalized bisphenol of formula (II) can include a tetramer where one or more of the oxygen atoms of the tetramer is functionalized, such as 1, 2, 3, or all 4 of the oxygen atoms of the tetramer is functionalized.

An amount of bisphenol represented by formula (II) in the reaction product (based on the total amount of bisphenol, trimer, and tetramer in the reaction product, the total amount of bisphenol, trimer, and tetramer in the reaction product not to exceed 100 wt %) can be about 75 wt % or more, such as about 76% or more, such as about 77% or more, such as about 78% or more, such as about 79% or more, such as about 80% or more, such as about 81% or more, such as about 82% or more, such as about 83% or more, such as about 84% or more, such as about 85% or more, such as about 86% or more, such as about 87% or more, such as about 88% or more, such as about 89% or more, such as about 90 wt % or more, such as about 91% or more, such as about 92% or more, such as about 93% or more, such as about 94% or more, such as about 95% or more, such as about 96% or more, such as about 97% or more, such as about 98% or more, such as about 99% or more, such as about 99.9% or more, such as about 100%, though other amounts are contemplated.

In some embodiments, an amount of trimer in the reaction product comprising the bisphenol of formula (II) can be about 25 wt % or less, such as about 20 wt % or less, such as about 15 wt % or less such as about 10 wt % or less, such as about 5 wt % or less, such as about 1 wt % or less, such as about 0 wt %, based on the total amount of bisphenol, trimer, and tetramer in the reaction product, the total amount of bisphenol, trimer, and tetramer in the reaction product not to exceed 100 wt %.

In some embodiments, a total amount of tetramer(s) in the reaction product comprising the bisphenol of formula (II) can be about 25 wt % or less, such as about 20 wt % or less, such as about 15 wt % or less such as about 10 wt % or less, such as about 5 wt % or less, such as about 1 wt % or less, such as about 0 wt %, based on the total amount of bisphenol, trimer, and tetramer in the reaction product, the total amount of bisphenol, trimer, and tetramer in the reaction product not to exceed 100 wt %.

The formation of the bisphenol of formula (II) can be characterized as having high conversion of the at least one phenol of formula (I) to a reaction product (for example, first composition 201) comprising the bisphenol of formula (II), one or more additional components (for example, trimers, tetramers, lights, heavies, among others), or combinations thereof. The amount of conversion of the at least one phenol of formula (I) can be about 90% or more, such as about 91% or more, such as about 92% or more, such as about 93% or more, such as about 94% or more, such as about 95% or more, such as about 96% or more, such as about 97% or more, such as about 98% or more, such as about 99% or more, such as about 99.9% or more conversion, such as about 100% conversion, though other conversion percentages are contemplated.

Subsequent Processing

Embodiments of the present disclosure also generally relate to utilization of bisphenols described herein as a raw material component of resin compositions, such as epoxy resin compositions and polycarbonate resin compositions, among other resin compositions and polymers. For example, when the bisphenol of formula (II) includes TMBPF, the TMBPF can be converted to TMBPF-DGE.

In some embodiments, the product mixture (or the reaction product) comprising the bisphenol of formula (II)—which can be formed from operation 520, optional operation 525, or both—can be integrated with a reactor for subsequent processing. Alternatively, and depending on, for example, the catalyst used to form the bisphenol, subsequent processing may occur directly in the same reactor in which the bisphenol is formed.

The product mixture (or reaction product) comprising bisphenol of formula (II) formed after post-reaction period 515, operation 520, optional operation 525, or combinations thereof can correspond to first composition 201. As described above, and as a non-limiting example, the first composition 201 can be converted to the second composition 202 comprising a glycidated bisphenol. In general, the product mixture comprising bisphenol can be subjected to subsequent processing, where the subsequent processing can include converting the reaction product comprising the bisphenol of formula (II) with a reactant that chemically attaches one or more polymerizable groups to the oxygen atom(s) of the bisphenol. For example, the glycidation reaction can be utilized to form a diglycidyl ether (for example, TMBPF-DGE).

As other non-limiting examples of subsequent processing, acrylation, acylation, alkylation or any suitable reaction can be performed on the product mixture comprising bisphenol of formula (II) to form a polymerizable group chemically bonded to an oxygen atom of the bisphenol (and if present, an oxygen atom of the one or more trimers, one or more tetramers, or combinations thereof) of first composition. An example of bisphenol having polymerizable groups (a functionalized bisphenol) is represented by formula (IV):

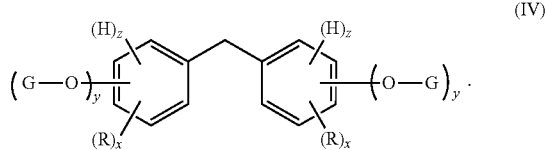

(IV)

In formula (IV), each (O-G) is a group substituted for a hydrogen atom on the individual aromatic ring; G represents a polymerizable group chemically attached to the oxygen (O) atom, and each of H, R, x, y, and z are described above. Each G group can be the same or different. In some embodiments, each G group can, independently, include an epoxide, an alkene, an acrylate, a nitrile, or other polymerizable functional group.

Figure 7A:
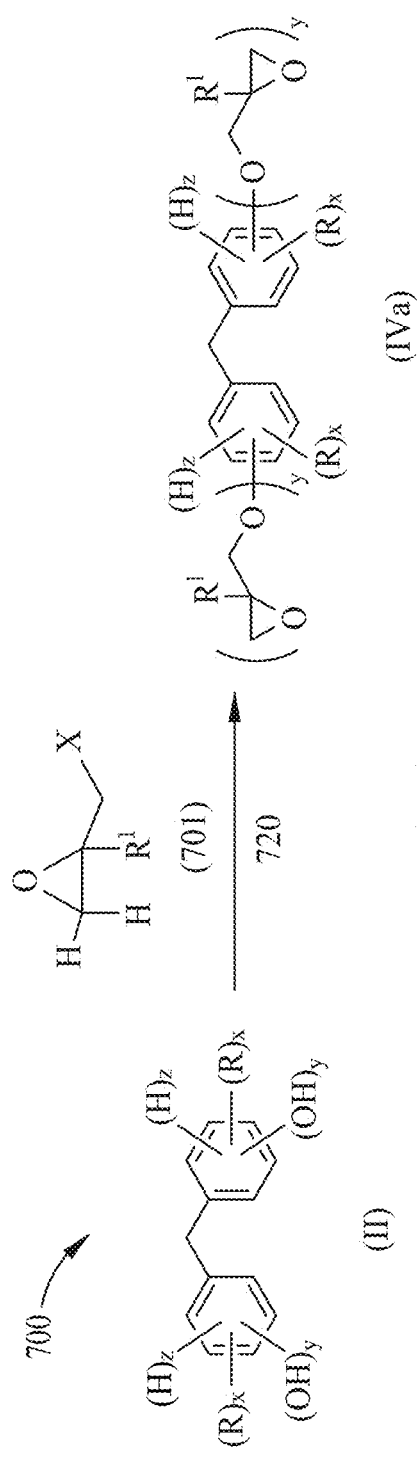
FIG. 7A shows a non-limiting reaction diagram for forming a bisphenol diglycidyl ether according to at least one embodiment of the present disclosure.

FIG. 7A shows a reaction diagram 700 for an example conversion process subsequent to forming the bisphenol of formula (II). In this example, a glycidation reaction is shown. The reaction diagram 700 is only an example and is not limiting. As shown, and in some embodiments, processes described herein can further include converting at least a portion of the reaction product comprising bisphenol of formula (II) to a conversion product such as an epoxy resin composition comprising a diglycidated product of formula (IVa). The conversion process generally includes reacting the reaction product comprising the bisphenol of formula (II) with an epihalohydrin 701 under the conversion conditions 720.

Non-limiting examples of the epihalohydrin 701 include those epihalohydrins where X is a halogen such as F, Cl, Br, or I, such as Cl or Br; $R^1$ is a hydrogen atom, an unsubstituted hydrocarbyl, or an unsubstituted hydrocarbyl; or combinations thereof. The $R^1$ group of epihalohydrin 701 can include 1 to 20 carbon atoms, such as 1 to 10 carbon atoms, such as 1 to 4 carbon atoms. In some embodiments, the epihalohydrin 701 comprises epichlorohydrin (X=Cl and $R^1$=H; CAS No. 106-89-8), epibromohydrin (X=Br and $R^1$=H in formula (II); CAS No. 3132-64-7), or combinations thereof.

In some embodiments, the conversion conditions 720 can include using a stoichiometric excess of the epihalohydrin 701 relative to the bisphenol of formula (II). The epihalohydrin(s) and the bisphenol can be employed in a molar ratio of from about 7:1 to about 1:1, such as from about 6:1 to about 1.01:1, such as from about 5:1 to about 3:1, such as from about 4:1 is used, though other molar ratios are contemplated.

The conversion conditions 720 can also include use a coupling catalyst. The coupling catalyst may be used to facilitate reaction of the epihalohydrin 701 and the bisphenol of formula (II). A non-limiting example of a suitable coupling catalyst is an ammonium halide salt, such as ammonium chloride salts or ammonium bromide salts, such as butyl trimethyl ammonium chloride or tetrabutyl ammonium bromide, or hydroxyl salts, such as sodium hydroxide, lithium hydroxide, or potassium hydroxide, among others. More than one coupling catalyst can be utilized. The coupling catalyst, if used, can be included at any suitable concentration level in the reaction mixture, such as from about 2 wt % to about 10 wt % weight percent relative to the level of the bisphenol reactant (for example, TMBPF) in the reaction mixture.

In some examples, the bisphenol of formula (II) (or the reaction product comprising the bisphenol of formula (II) can include one or more of the following operations after reaction with the epihalohydrin commences: (i) removing excess epihalohydrin in one or more operations (for example, via application of vacuum, heat, or both), (ii) dehydrohalogenating the composition in one or more operations (before, after, or both before and after removing any excess epihalohydrin) to achieve a suitably low level of hydrolyzable chloride content, and (iii) washing out salts (for example, NaCl via an aqueous work-up) that may have been generated in any dehydrohalogenating operation(s). Suitable dehydrohalogenating agents that can be employed include alkali metal hydroxides such as, for example, sodium hydroxide, potassium hydroxide, lithium hydroxide, and mixtures thereof.

As discussed above, the reaction product comprising the bisphenol of formula (II) can include one or more optional components that include a trimer, a tetramer, lights, heavies, or combinations thereof. In some examples, these one or more optional components can be present in the reaction product that is subjected to a conversion reaction, such that the reaction product comprising the functionalized bisphenol of formula (IV) can include functionalized trimers, functionalized tetramers, lights, heavies, or combinations thereof. The functionalized trimers and functionalized tetramers have functionalization at the oxygen atom of a phenol group in a similar manner as that discussed above with respect to the functionalized bisphenol of formula (IV). The reaction product comprising the functionalized bisphenol of formula (IV) can be a resin composition.

Functionalized trimers in the reaction product or resin composition comprising the functionalized bisphenol of formula (IV) can include a trimer where one or more of the oxygen atoms of the trimer is functionalized, such as 1, 2, or all 3 of the oxygen atoms of the trimer is functionalized. Similarly, functionalized tetramers in the reaction product or resin composition comprising the functionalized bisphenol of formula (IV) can include a tetramer where one or more of the oxygen atoms of the tetramer is functionalized, such as 1, 2, 3, or all 4 of the oxygen atoms of the tetramer is functionalized.

In some embodiments, a resin composition (for example, an epoxy resin composition) comprising the functionalized bisphenol of formula (IV) (such as TMBPF-DGE) and one or more optional components is provided. An amount of a functionalized bisphenol of formula (IV) in the resin composition or reaction product (based on the total amount of functionalized bisphenol, functionalized trimer, and functionalized tetramer in the reaction product, the total amount of bisphenol, functionalized trimer, and functionalized tetramer in the reaction product not to exceed 100 wt %) can be about 75 wt % or more, can be about such as about 76% or more, such as about 77% or more, such as about 78% or more, such as about 79% or more, such as about 80% or more, such as about 81% or more, such as about 82% or more, such as about 83% or more, such as about 84% or more, such as about 85% or more, such as about 86% or more, such as about 87% or more, such as about 88% or more, such as about 89% or more, such as about 90 wt % or more, such as about 91% or more, such as about 92% or more, such as about 93% or more, such as about 94% or more, such as about 95% or more, such as about 96% or more, such as about 97% or more, such as about 98% or more, such as about 99% or more, such as about 99.9% or more, such as about 100%, though other amounts are contemplated.

In some embodiments, an amount of functionalized trimer in the resin composition or reaction product comprising the functionalized bisphenol of formula (IV) can be about 25 wt % or less, such as about 20 wt % or less, such as about 15 wt % or less such as about 10 wt % or less, such as about 5 wt % or less, such as about 1 wt % or less, such as about 0 wt %, based on the total amount of bisphenol, trimer, and tetramer in the reaction product, the total amount of bisphenol, trimer, and tetramer in the reaction product not to exceed 100 wt %.

In some embodiments, a total amount of tetramer(s) in the resin composition or reaction product comprising the functionalized bisphenol of formula (IV) can be about 25 wt % or less, such as about 20 wt % or less, such as about 15 wt % or less such as about 10 wt % or less, such as about 5 wt % or less, such as about 1 wt % or less, such as about 0 wt %, based on the total amount of bisphenol, trimer, and tetramer in the reaction product, the total amount of bisphenol, trimer, and tetramer in the reaction product not to exceed 100 wt %.

Figure 7B:
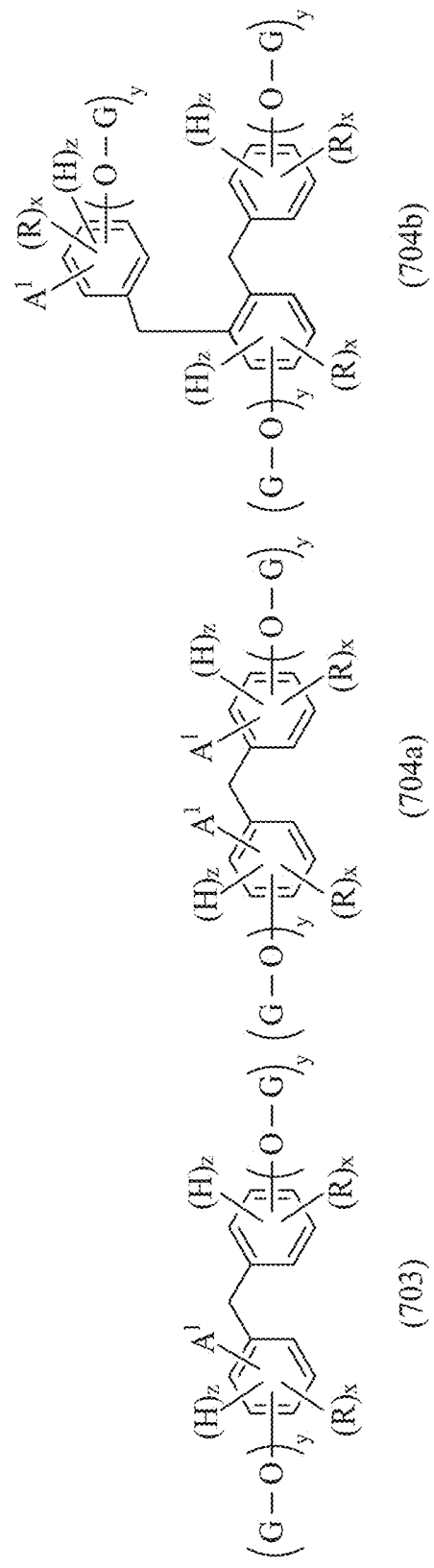
FIG. 7B shows examples of one or more additional components that can be formed during subsequent processing of a bisphenol according to at least one embodiment of the present disclosure.

As described herein, the reaction product comprising the functionalized bisphenol of formula (IV) can include one or more additional components, such as a trimer, a tetramer, lights, and heavies. As shown in FIG. 7B, a trimer and a tetramer of the reaction product comprising the functionalized bisphenol of formula (IV) can include a trimer 703, a tetramer 704a, a tetramer 704b, or combinations thereof. In the trimer 703, the tetramer 704a, the tetramer 704b, or combinations thereof, $A^1$ is a group substituted for a hydrogen atom on the aromatic ring, and can be represented by the structure:

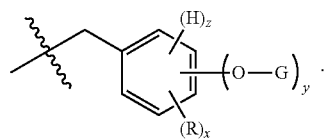

wherein:
O-G, H, R, x, y, and z are described above; and
the wavy bond represents a connection to an aromatic ring.

In some embodiments, the reaction product comprising the functionalized bisphenol of formula (IV) (such as reaction product comprising the diglycidated bisphenol of formula (IVa)) can have an epoxy group content that is about 1,000 mmol/kg, such as about 3000 mmol/kg, such as about 4,000 mmol/kg or more, such as about 5,000 mmol/kg. In these and other embodiments, the reaction product comprising the functionalized bisphenol of formula (IV) can have an epoxy group content that is about 10,000 mmol/kg or less, such as about 8,000 mmol/kg or less, such as about 7,000 mmol/kg or less, such as about 6,000 mmol/kg or less.

Resin compositions (for example, the reaction product comprising the bisphenol having polymerizable groups represented by formula (IV), the reaction product comprising the diglycidated bisphenol of formula (IVa), and second composition 202, among others) may be used to make any suitable type of polymer. For example, the reaction product comprising the diglycidated bisphenol of formula (IVa) can be used to make any type of polymer in which a diepoxide reactant is typically used, including, for example, polymers for use in the coatings, composites, or adhesives industries.

The resin compositions described herein can be used as binders, paints, sealants, among other applications. For example, the compositions can be used in construction, with installation of concrete and cement, such as high-gloss concrete installations. Another use includes coating metals. Other end-use applications for the compositions described herein include, but are not limited to: cellulosic, lignocellulosic, and wood products; plastics; fabrics (wovens and non-wovens); and glass. The compositions can be used generally for producing composites, adhesives, insulation materials, shaped products, binders, laminates, among other articles and articles of manufacture.

The following examples are put forth so as to provide those of ordinary skill in the art with a complete disclosure and description of how to make and use embodiments of the present disclosure, and are not intended to limit the scope of embodiments of the present disclosure. Efforts have been made to ensure accuracy with respect to numbers used but some experimental errors and deviations should be accounted for.

EXAMPLES

Test Methods
1. Characterization of Bisphenols of Formula (II) and by-Products

Bisphenols of formula (II) and by-products from reactions to form bisphenols of formula (II) were characterized by the following test methods.

Ultra-high performance liquid chromatography (UHPLC) coupled with diode array detection (DAD) was applied to the samples to improve separation of the trimers and tetramers from the other products including by-products in the reaction product. UHPLC-DAD was performed as follows. Analysis was performed on an Agilent 1290 Infinity II ultra-high performance liquid chromatograph, equipped with a multi sampler and 20 µL injection loop, binary pump, solvent selection valve head, multicolumn thermostat with 8-column selector valve and diode array detector. A Waters Acquity UPLC BEH (ultra-performance liquid chromatography ethylene bridged hybrid) C18 column (1.7 µm particles, 2.1 mm×150 mm) was used.

The sample preparation for measuring the trimer and tetramer products was performed as follows. First a stock solution of 100 mg anisole and 150 g ACN was made. In a suitable container, 100 mg of TMBPF and 10 g of the stock solution was added and homogenized. All weights were denoted to 0.1 mg accuracy. Finally, the sample was filtered through a 0.2 µm polytetrafluoroethylene (PTFE) disposable syringe filter.

Ultra-high performance liquid chromatography coupled to mass spectrometry (UHPLC-MS) was utilized for peak identification. Identification of unknown components was performed on an Agilent 6120B single quadrupole mass spectrometer with electrospray ionization. The mass spectrometer was directly coupled to the UHPLC.

Confirmation of the trimer was determined by $^{13}$C NMR (100 MHz) spectrometry with CDCl$_3$ as the deuterated solvent. The weight percent of the other trimers (as by-products) of the reaction to form TMBPF, tetramers (as by-products) of the reaction to form TMBPF, lights, and heavies were determined using the same procedures above. In the reaction to form the TMBPF, the lights have a boiling point lower than that of TMBPF, and the heavies have a boiling point lower than that of TMBPF that are not the trimers or tetramers.

2. Characterization of Glycidated Products

Certain glycidated products were characterized by the following test methods.

Diglycidated and triglycidated trimers were characterized of TMBPF-DGE were characterized by UHPLC-DAD analysis using an Agilent 1290 II UHPLC with a binary pump, 1290 injection system and 1290 DAD detector. A Waters Acquity UPLC BEH C18 column (1.7 µm, 2.1 mm×150 mm) was used.

The sample preparation for measuring the diglycidated and triglycidated trimers was performed as follows. To a suitable container, 750 mg TMBPF-DGE, 50 mg anisole (internal standard) and 25 ml of ACN were added and homogenized. All weights were denoted to 0.1 mg accuracy. No internal standard was left out and a 100% calculation was applied, thus weights were not recorded. The sample was filtered through a 0.2 µm PTFE disposable syringe filter into a 2 mL vial.

UHPLC-MS was utilized for peak identification. Identification of unknown components was performed on an Agilent 6120B single quadrupole mass spectrometer with an atmospheric pressure electrospray ionization (ESI) interface. The mass spectrometer was directly coupled to the UHPLC.

The same UHPLC settings were used as described above for the diglycidated trimer and triglycidated trimer. No NMR was applied. Structures were identified based on molar mass.

Example 1: Bisphenols

Formation of bisphenols by embodiments described herein were performed utilizing various solvents, catalysts, and phenols. For this example, TMBPF was chosen as the target bisphenol. In this example, the general reaction scheme for forming TMBPF is shown in Scheme 1.

Scheme 1

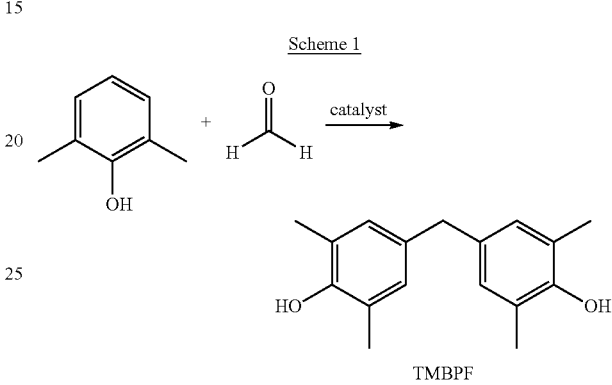

For all Examples 1A-1F described below, formation of the TMBPF was performed using a 37 wt % formaldehyde solution in water.

Example 1A: An example TMBPF was made according to the following non-limiting procedure. To a round-bottom flask as a reactor was charged 1,3,5-trimethylbenzene (about 50.4 g; about 44.9 wt %) as solvent, 2,6-xylenol (about 50.8 g; about 45.3 wt %) as phenol, oxalic acid catalyst (about 1.9 g; about 1.7 wt %), and formalin (about 24.7 g; about 8.1 wt % (dry basis)) as the source of formaldehyde. The molar ratio of 2,6-xylenol to formaldehyde was about 2:1.5. However, the stoichiometric ratio of monophenol to formaldehyde is 2:1 used for the reaction. A 2:1.5 molar ratio of 2,6-xylenol to formaldehyde means that 50% excess formaldehyde is added.

The mixture was stirred and heated at reflux for about 18 h, and a conversion of about 97% 2,6-xylenol was observed. The reaction mixture was clear and fully dissolved at temperatures above about 145° C. After distillation, a product mixture with about 53.6 wt % TMBPF, and 3.5 wt % trimer (hexamethyl trisphenol F, 302 in FIG. 3) was obtained. The product mixture also contained by-products based on 1,3,5-trimethylbenzene, characterized as the following by-products:

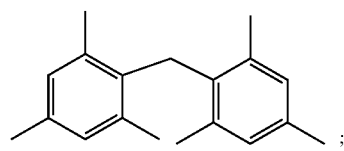

(by-product 1A-1)

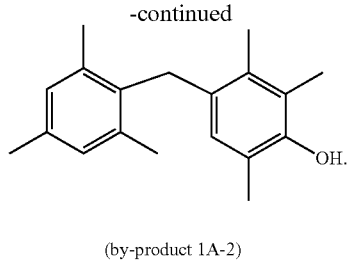

(by-product 1A-2)

Other by-products were also observed but were not characterized. Example 1A illustrated that, for example, TMBPF can be formed with high conversion of the starting 2,6-xylenol as the phenol.

Example 1B: In this example, the TMBPF was made using tert-butylbenzene as a solvent according to the following non-limiting procedure. To a round-bottom flask as a reactor was charged tert-butylbenzene (about 50.6 g, about 45.2 wt %) as solvent, 2,6-xylenol (about 50.3 g, about 44.9 wt %) as phenol, oxalic acid catalyst (about 1.9 g; about 1.7 wt %; about 5 mol % relative to 2,6-xylenol), and formalin (about 8.2 wt % (dry basis)) as the source of formaldehyde. The molar ratio of 2,6-xylenol to formaldehyde was about 2:1.5. The molar ratio of 2,6-xylenol to formaldehyde was about 2:1.5. However, the stoichiometric ratio of monophenol to formaldehyde is 2:1 used for the reaction. A 2:1.5 molar ratio of 2,6-xylenol to formaldehyde means that 50% excess formaldehyde is added.

The mixture was stirred and heated at reflux for about 18 h, and a conversion of about 99% 2,6-xylenol was observed. After distillation (using an oil bath set to a temperature of about 205° C.) only small amounts of oxalic acid were observed in the Dean-Stark setup. During distillation, only small amounts of tert-butylbenzene solvent were distilled. No by-products based on the tert-butylbenzene solvent were detected. The product mixture contained about 51 wt % TMBPF (the bisphenol), about 4.8 wt % trimer (hexamethyl trisphenol F, 302 in FIG. 3), and about 0.3 wt % 2,6-xylenol.

Example 1B illustrated that, for example, solvent based by-products can be prevented, or at least mitigated, by solvent selection. For example, no by-products based on the tert-butylbenzene solvent were observed. While not wishing to be bound by theory, it is believed that this result is due to the lower aromatic reactivity of tert-butylbenzene, as it has only one organic substituent on the aromatic ring instead of three organic substituents in the case of 1,3,5-trimethylbenzene. It was also noted that tert-butylbenzene has a similar boiling point (about 169° C.) as that of 1,3,5-trimethylbenzene (about 165° C.). Example 1B also illustrated that TMBPF can be formed at high yields with low amounts of by-products (trimer, tetramer, lights, and heavies) and high conversion of the starting 2,6-xylenol as the phenol.

Examples 1C-1F: Further experiments were performed to make TMBPF using the procedure of Example 1B (shown as Examples 1C-1E in Table 1). A similar procedure was carried out at large scale (example 1F) using an overhead mechanical stirrer and heating with an electric heating mantle. Certain reaction details are shown in Table 1, including those for Examples 1A and 1B. In Table 1, the wt % are in dry basis, and for formaldehyde, the amount shown excludes water from the 37% formaldehyde solution. In each example, the mol % of oxalic acid to the 2,6-xylenol was about 5 mol %. For Example 1A, the solvent is 1,3,5-trimethylbenzene. For Examples 1B-1F, the solvent is tert-butylbenzene.

The stoichiometric ratio of monophenol to formaldehyde is 2:1 used for the reaction, but the reaction is performed with excess formaldehyde. A 2:1.5 molar ratio of 2,6-xylenol to formaldehyde means that 50% excess formaldehyde is added, while a 2:1.75 molar ratio of 2,6-xylenol to formaldehyde means that a 75% excess formaldehyde is used.

TABLE 1

| | Example | | | | | |
|---|---|---|---|---|---|---|
| | Ex. 1A | Ex. 1B | Ex. 1C | Ex. 1D | Ex. 1E | Ex. 1F |
| Solvent, wt % | 44.9 | 45.2 | 65.6 | 55.0 | 44.4 | 44.4 |
| 2,6-xylenol, wt % | 45.3 | 44.9 | 28.1 | 36.8 | 44.4 | 44.4 |
| formaldehyde 100%, wt % | 8.1 | 8.2 | 5.2 | 6.8 | 9.5 | 9.6 |
| oxalic acid, wt % | 1.7 | 1.7 | 1.0 | 1.4 | 1.7 | 1.6 |
| Molar ratio of 2,6-xylenol to formaldehyde | 2:1.5 | 2:1.5 | 2:1.5 | 2:1.5 | 2:1.75 | 2:1.75 |

Selected results from the reaction to form TMBPF as an example bisphenol are shown in Table 2. As shown in Table 2, the reaction product includes the following: TMBPF, 2,6-xylenol (unreacted phenol), trimers (by-product), tetramers (by-product), lights, and heavies. One of the trimers is hexamethyl trisphenol F. The total weight of these materials is shown as "Total." The percent conversion of 2,6-xylenol is also presented in Table 2. "Percent TMBPF of Total (with unreacted phenol)" refers to the percent of TMBPF obtained based on a total of TMBPF, 2,6-xylenol (unreacted phenol), trimers (by-product), tetramers (by-product), lights, and heavies. "Percent TMBPF of Total (without unreacted phenol)" refers to the percent of TMBPF based on the total wt % excluding the 2,6-xylenol (unreacted phenol). "Percent TMBPF of Total (without lights and heavies)" refers to the percent TMBPF based on the total of TMBPF, trimers, and tetramers only. The lights and heavies were not characterized.

TABLE 2

| | Example | | |
|---|---|---|---|
| | Ex. 1A | Ex. 1B | Ex. 1F |
| TMBPF, wt % | 53.6 | 51 | 50.4 |
| 2,6-xylenol, wt % | 0.61 | 0.27 | 0.04 |
| Trimers, wt % | 3.48 | 4.75 | 4.02 |
| Tetramers, wt % | 0.22 | 0.34 | 0.31 |
| Lights, wt % | 0.28 | 0.33 | 0.35 |
| Heavies, wt % | 0.4 | 0.96 | 0.83 |

TABLE 2-continued

| | Example | | |
|---|---|---|---|
| | Ex. 1A | Ex. 1B | Ex. 1F |
| Total, wt % | 58.6 | 57.6 | 55.9 |
| Percent Conversion of 2,6-xylenol, % | 97 | ≥99 | ≥99 |
| Percent TMBPF of Total (with unreacted phenol), % | 91.5 | 88.5 | 90.2 |
| Percent TMBPF of Total (without unreacted phenol), % | 92.4 | 89.0 | 90.2 |
| Percent TMBPF of Total (without lights and heavies), % | 93.5 | 90.9 | 92.1 |

Overall, the non-limiting results shown in Table 2 illustrate that, for example, TMVBPF and other bisphenols can be formed at high yields with low amounts of by-products (trimer, tetramer, lights, and heavies). When tert-butylbenze is used as the solvent for the reaction (Examples 1B and 1F), little or no solvent-based by-products are observed. Small amounts (about 7 wt %) of solvent-based by-products, such as by-products 1A-1 and 1A-2, are observed when using 1,3,5-trimethylbenzene as the solvent for the reaction (Example 1A).

The percent conversion of the 2,6-xylenol as the phenol was very good for all examples, with about 97% conversion for Example 1A, and ≥99% conversion for Examples 1B and 1F. The high conversion of 2,6-xylenol is achieved, at least in part, by using a stoichiometric excess of formaldehyde relative to the monophenol, in contrast to conventional technologies utilizing excess 2,6-xylenol. Of note, the high conversion of 2,6-xylenol as shown by the Examples can allow the process described herein to be free of costly and time-consuming separation and recycling operations.

Moreover, the water formed from the condensation reaction to make TMBPF can be distilled off with the excess formaldehyde. In addition, decomposition of the oxalic acid to $CO_2$ at a temperature around the boiling temperature of the solvent permits removal of oxalic acid catalyst from the TMBPF, solvent, oxalic acid mixture. Here, for example, the oxalic acid can be decomposed or sublimed under the solvent reflux as described herein.

Further, embodiments of bisphenol formation presented herein can enable production of TMBPF (as an example bisphenol) to be produced in a product mixture that is ready for further processing such as glycidation. Such a result that can be achieved by embodiments described herein contrasts conventional technologies which utilize solid-liquid separations, washing operations, and drying operations resulting in a pure, dry powder of TMBPF that is difficult to handle. Additionally, the examples illustrate that no dry powder handling of TMBPF is needed, making the loading of the product mixture comprising TMBPF in the form of a slurry (as an example bisphenol slurry) into a subsequent process faster and safer than conventional processing of TMBPF.

Example 2: Glycidation

Glycidation was performed as an example of subsequent processing of TMBPF. The general reaction scheme for the glycidation of TMBPF to TMBPF-DGE is shown in Scheme 2.

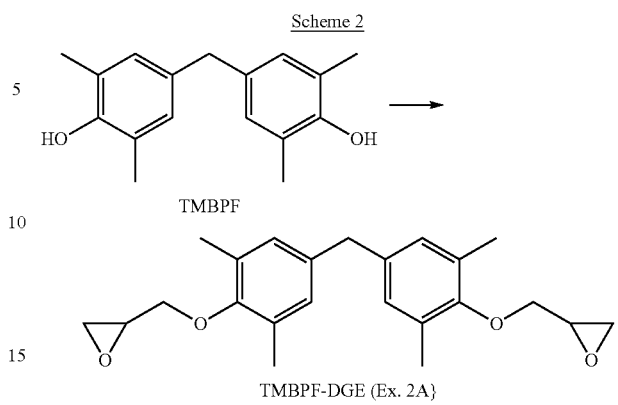

Scheme 2

For this glycidation experiment, the product mixture from Example 1A or 1B was used as the starting material. Each of the product mixtures included TMBPF, trimer, tetramer, lights, and heavies as a slurry. Synthesis of the diglycidyl ether of TMBPF (TMBPF-DGE) was performed according to the following procedure. A slurry of TMBPF and a stoichiometric excess of epichlorohydrin was added to a reactor fitted with an overhead condenser. The resultant mixture was stirred and the reactor was heated at a desired reaction temperature (between about 50° C. and about 80° C.). A coupling catalyst (for example, butyl trimethyl ammonium chloride or tetrabutyl ammonium bromide) was added and a vacuum was applied until the reaction mixture started to boil. Reflux was maintained for about 1 hour to about 3 hours. Sodium hydroxide was then dosed to the reaction mixture over a period of about 4 hours to about 6 hours. Water was then removed by azeotropic distillation. The reaction mixture was allowed to continue for about 15 minutes to about 45 minutes of post-reaction time. Excess epichlorohydrin and solvent was removed by vacuum distillation and was stripped with nitrogen for about 30 minutes to about 60 minutes. Solvent and water was added to the mixture, the mixture was stirred and the phases were separated. Water washing can be repeated to remove more water soluble components. Solvent was removed by vacuum distillation and stripping with nitrogen for about 30 minutes to about 60 minutes to afford TMBPF-DGE (Ex. 2A).

Besides TMBPF-DGE (Ex. 2A), products from the glycidation reaction of TMBPF included a diglycidated trimer (Ex. 2B), and a triglycidated trimer (Ex. 2C):

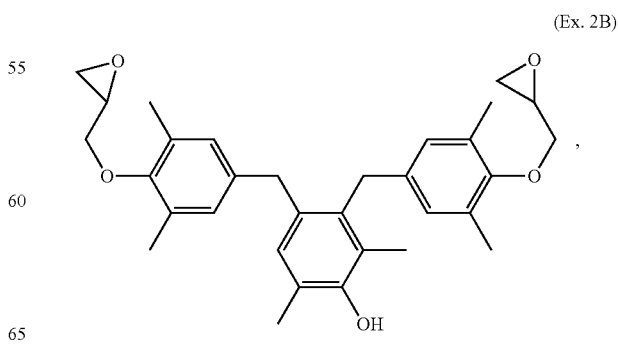
(Ex. 2B)

(Ex. 2C)

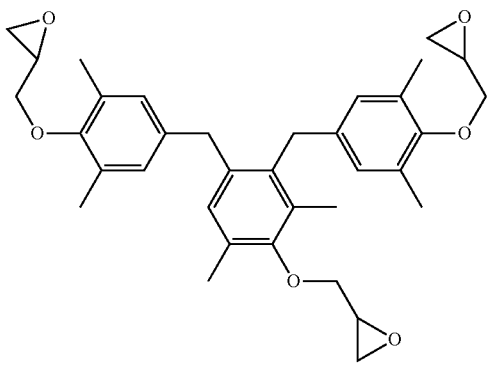

As described above, the product mixture used for the reaction to form TMBPF-DGE included a trimer (with three hydroxyl groups), but that trimer was not found in the product mixture that included TMBPF-DGE. This result indicated that the trimer with three hydroxyl groups fully converted to diglycidated trimer (Ex. 2B), triglycidated trimer (Ex. 2C), and monoglycidated trimer. This example illustrates that side products from the reaction to form TMBPF (one or more trimers, tetramers, among other side products) can also convert in the glycidation process and can be components in the TMBPF-DGE resin.

The epoxy group content of the TMBPF-DGE product mixture of Example 2 was determined to be about 5,430 mmol/kg. The viscosity of the TMBPF-DGE product mixture was determined to be about 130 Pa·s at 23° C.

Synthesis of the diglycidyl ether of biseugenol and the diglycidyl ether of bissyringol were also performed according to the same glycidation procedure. The epoxy group content of the diglycidyl ether of biseugenol was determined to be about 4,200 mmol/kg. The epoxy group content of the diglycidyl ether of bissyringol was determined to be about 4600 mmol/kg. The diglycidyl ether of biseugenol and the diglycidyl ether of bissyringol were solids at room temperature, and viscosity was not determined.

Embodiments described herein generally relate to processes for forming bisphenols and epoxy resin compositions. Bisphenols, such as TMBPF with high conversion of the starting phenol and with low amounts of by-products by using, for example, the stoichiometric excess of formaldehyde relative to the monophenol. The product mixture comprising bisphenol, in the form of, for example, a slurry, can be used for subsequent processing to, for example, resin compositions.

As used herein, reference to a chemical, an R group, alkyl, substituted alkyl, hydrocarbyl, or substituted hydrocarbyl without specifying a particular isomer (such as butyl) expressly discloses all isomers (such as n-butyl, iso-butyl, sec-butyl, and tert-butyl). For example, reference to an R group having 4 carbon atoms expressly discloses all isomers thereof. When a compound is described herein such that a particular isomer, enantiomer or diastereomer of the compound is not specified, for example, in a formula or in a chemical name, that description is intended to include each isomer and enantiomer of the compound described individual or in any combination.

As is apparent from the foregoing general description and the specific aspects, while forms of the aspects have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, process operation, process operations, an element or a group of elements is preceded with the transitional phrase "comprising," it is understood that we also contemplate the same composition or group of elements with transitional phrases "consisting essentially of," "consisting of," "selected from the group of consisting of," or "Is" preceding the recitation of the composition, process operation, process operations, element, or elements and vice versa, such as the terms "comprising," "consisting essentially of," "consisting of" also include the product of the combinations of elements listed after the term.

For purposes of this present disclosure, and unless otherwise specified, all numerical values within the detailed description and the claims herein are modified by "about" or "approximately" the indicated value, and consider experimental error and variations that would be expected by a person having ordinary skill in the art. For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. For example, the recitation of the numerical range 1 to 5 includes the subranges 1 to 4, 1.5 to 4.5, 1 to 2, among other subranges. As another example, the recitation of the numerical ranges 1 to 5, such as 2 to 4, includes the subranges 1 to 4 and 2 to 5, among other subranges. Additionally, within a range includes every point or individual value between its end points even though not explicitly recited. For example, the recitation of the numerical range 1 to 5 includes the numbers 1, 1.5, 2, 2.75, 3, 3.80, 4, 5, among other numbers. Thus, every point or individual value may serve as its own lower or upper limit combined with any other point or individual value or any other lower or upper limit, to recite a range not explicitly recited.

As used herein, the indefinite article "a" or "an" shall mean "at least one" unless specified to the contrary or the context clearly indicates otherwise. For example, aspects comprising "a monophenol" includes aspects comprising one, two, or more monophenols, unless specified to the contrary or the context clearly indicates only one monophenol is included.

While the foregoing is directed to aspects of the present disclosure, other and further aspects of the disclosure may be devised without departing from the basic scope thereof, and the scope thereof is determined by the claims that follow.

What is claimed is:

1. A process for making an epoxy resin composition, the process comprising:
    reacting a mixture comprising a catalyst, a monophenol, and an aldehyde or ketone, the mixture comprising a stoichiometric excess of the aldehyde or ketone to the monophenol;
    forming a reaction product with the reaction mixture, the reaction product comprising a bisphenol;
    removing water and unreacted aldehyde or ketone from the reaction product; and
    converting the reaction product comprising the bisphenol to an epoxy resin composition, wherein, after reacting the mixture and before converting the reaction product, the process is free of washing, drying, solid-liquid separation, or combinations thereof.

2. The process of claim 1, wherein the monophenol is represented by formula (I):

(I)

wherein, in formula (I):
H is a hydrogen atom on the aromatic ring;
R is a group substituted for a hydrogen atom on the aromatic ring;
OH is a hydroxyl group substituted for a hydrogen atom on the aromatic ring;
x is from 1 to 4, and when x is more than 1, each R group is the same or different;
y is 1;
z is from 1 to 4; and
x+y+z is 6.

3. The process of claim 2, wherein:
each R group of formula (I) is, independently, an unsubstituted hydrocarbyl having from 1 to 20 carbon atoms or a substituted hydrocarbyl having from 1 to 20 carbon atoms; and
the aldehyde comprises formaldehyde.

4. The process of claim 2, wherein:
each R group of formula (I) is ortho to the hydroxyl group;
x in formula (I) is 2; or
combinations thereof.

5. The process of claim 4, wherein the mixture comprises about 74 wt % to about 86 wt % of the monophenol based on a total wt % of the monophenol, the aldehyde or ketone, and the catalyst.

6. The process of claim 1, wherein the stoichiometric excess of the aldehyde or ketone to the monophenol is from about 1.05 to about 5.

7. The process of claim 6, wherein, when the catalyst is an acid catalyst:
the acid catalyst is selected from the group consisting of hydrochloric acid, sulfuric acid, phosphoric acid, methanesulfonic acid, p-toluenesulfonic acid, trifluoroacetic acid, oxalic acid, and combinations thereof;
the process further comprises removing the acid catalyst by heating, addition of a base, or combinations thereof; or
combinations thereof.

8. The process of claim 6, wherein, when the catalyst is a base catalyst, the base catalyst is selected from the group consisting of sodium hydroxide, potassium hydroxide, sodium carbonate, sodium hydrogen carbonate, sodium bicarbonate, potassium carbonate, potassium bicarbonate, and combinations thereof.

9. The process of claim 1, wherein the process is performed in a single reactor, performed in situ, or performed continuously.

10. The process of claim 1, wherein the bisphenol is represented by formula (II):

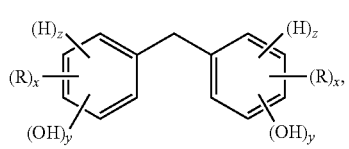

(II)

wherein, in formula (II):
each H is a hydrogen atom on each aromatic ring;
each R is a group substituted for a hydrogen atom on each aromatic ring, each R group being the same or different;
each OH is a hydroxyl group substituted for a hydrogen atom on each aromatic ring;
each x is from 1 to 4, and each x is the same or different;
each y is from 1 to 4, and each y is the same or different; and
each z is from 0 to 3.

11. The process of claim 1, wherein:
an amount of the monophenol in the mixture before reacting is about 74 wt % or more based on a total weight of the aldehyde or ketone, the catalyst, and the monophenol; and
an amount of the monophenol in the mixture after reacting is less than about 3 wt % based on a total weight of the aldehyde or ketone, the catalyst, and the monophenol.

12. The process of claim 11, wherein:
the reaction product further comprises one or more optional components, the one or more optional components comprising a trimer, tetramer, or combinations thereof; and
an amount of the bisphenol in the reaction product is greater than about 80 wt % or more based on a total amount of the bisphenol, trimer, and tetramer, the total weight of the bisphenol, the trimer, and the tetramer not to exceed 100 wt %.

13. A process for converting a monophenol to a conversion product, the process comprising:
reacting a mixture comprising an aldehyde or ketone, a catalyst, a solvent, and a monophenol, to form a reaction product comprising a bisphenol, wherein the mixture comprises a stoichiometric excess of the aldehyde or ketone to the monophenol;
removing water and remaining aldehyde or ketone from the reaction product, the solvent having a boiling point of about 150° C. or more at 100 kPa (absolute); and
converting the reaction product comprising the bisphenol to a conversion product, wherein, after reacting the mixture and before converting the reaction product, the process is free of washing, drying, solid-liquid separation, or combinations thereof.

* * * * *